United States Patent [19]

Deschaine

[11] Patent Number: 4,825,433

[45] Date of Patent: Apr. 25, 1989

[54] DIGITAL BRIDGE FOR A TIME SLOT INTERCHANGE DIGITAL SWITCHED MATRIX

[75] Inventor: Stephen A. Deschaine, Garland, Tex.

[73] Assignee: DSC Communications Corporation, Plano, Tex.

[21] Appl. No.: 148,383

[22] Filed: Jan. 25, 1988

Related U.S. Application Data

[63] Continuation-in-part of Ser. No. 939,036, Dec. 8, 1986, Pat. No. 4,771,420.

[51] Int. Cl.$^4$ ............................................. H04Q 11/04
[52] U.S. Cl. ...................................... 370/62; 379/202
[58] Field of Search .................. 370/62, 110.1, 58, 66, 370/68, 63; 379/202, 206, 207

[56] References Cited

U.S. PATENT DOCUMENTS

| | | | |
|---|---|---|---|
| 3,678,205 | 7/1972 | Cohen et al. | |
| 4,112,258 | 9/1978 | Alles | |
| 4,280,210 | 7/1981 | Zeitrag | 370/62 |
| 4,320,501 | 3/1982 | Le Dieu et al. | 370/63 |
| 4,450,557 | 5/1984 | Munter | 370/58 |
| 4,455,648 | 6/1984 | Binz et al. | 370/66 |
| 4,470,139 | 9/1984 | Munter | 370/66 |
| 4,607,362 | 8/1986 | Vary et al. | 370/62 |
| 4,661,949 | 4/1987 | Sato | 370/62 |

OTHER PUBLICATIONS

Digital Switch Corporation, DEXCS-1 Digital Multipoint Bridging Feature Description, 10/85, Document #: Section 312-302-100.
Digital Switch Corporation, DEXCS 1 336DMB Digital Multipoint Bridge Circuit Description, 11/86, Document #: Section 312-314-100.

*Primary Examiner*—Robert L. Griffin
*Assistant Examiner*—Frank M. Scutch, III
*Attorney, Agent, or Firm*—Jerry W. Mills; Jefferson Perkins

[57] ABSTRACT

A time slot interchange matrix is comprised of a plurality of matrix modules (50–56) each for receiving data on a plurality of channels and transmitting data on the same number of channels. Each of the modules consists of separate banks of random access memory that are interfaced with an intramatrix bus (70) for receiving data from each of the matrix modules in the system for storage therein during a collection frame. During a transmission frame, this information is randomly accessed in accordance with an interconnect pattern stored in a control RAM (122) for output from the digital matrix module. Each digital matrix module stores all of the information in the system such that the system is nonblocking for any given channel stored such that information is not impeded by the interconnect pattern of another digital matrix module. A digital bridge (80) is provided for collecting the information during a collection frame and then accumulating the information in a bridge IC circuit (137) as a conference. The accumulated information is stored in a RAM (406) and then output during the transmission frame to the individual conferees in a conference. Echo cancelling is provided by storing the conferee data in conference RAMS (344) and (346) for subtraction in a subtraction circuit (408) during the transmission frame.

26 Claims, 7 Drawing Sheets

DIGITAL BRIDGE FOR A TIME SLOT
INTERCHANGE DIGITAL SWITCHED MATRIX

CROSS REFERENCE TO RELATED APPLICATIONS

This application is a continuation-in-part of U.S. patent application Ser. No. 939,036 filed Dec. 8, 1986, now U.S. Pat. No. 4,771,420.

TECHNICAL FIELD OF THE INVENTION

The present invention pertains in general to telephone switching matrices and, more particularly, to a switch matrix of the time slot interchange type.

BACKGROUND OF THE INVENTION

The telephone switching matrix can be of two forms, a time matrix or a space matrix. A space matrix is essentially a hardwired connection whereas a time matrix involves some minimal time delay in order to provide the switching. One form of a time matrix is a time slot interchange (TSI) which collects data in a given transmission frame, stores the data and then outputs the data in a subsequent frame. During the subsequent frame, the data is output in a different sequence than when it was received. A description of a TSI switch can be found in U.S. Pat. No. 4,112,258, issued to H. G. Alles.

In most telephone transmission protocols, the information is divided into a plurality of time domain multiplexed channels such that a predetermined number of channels exist in a given sample frame. Each channel consists of one sample of a linear value that is digitized and transmitted in a given time slot in the time frame. The preferential way of transmitting digital information is by pulse-code modulation (PCM).

A demultiplexer is typically disposed at the receiving end in the transmission system for receiving the digitized data stream and routing this information to a particular location which is a function of the time position in a particular frame. For example, if a frame were comprised of twenty-four channels, the PCM information in the first channel would be routed to a first location and the information in the second channel would be routed to a second location, the remaining channels being routed to a different location also. This continues for each frame with a first location receiving the information stored in the first channel of each frame, each channel distinguished by its time slot or position in the frame. It is necessary that the first time slot in each frame receive information for only one channel in each successive frame. This is normally a straightforward task when a system is synchronized with respect to frames. However, if information is to be switched in anything other than a T1 format, there is a potential that the integrity of the channels can be altered.

In a conventional TSI system, information is received and sequentially stored in a random access memory (RAM) in a given frame. In the next successive frame, this information is randomly output to a different channel in a different time slot. For example, if information in channel 1 of a collection frame is received from position A and this information is to be transmitted to a position B which corresponds to the second channel in the transmission frame, it would be necessary to access the stored information in the RAM in a different sequence than it was stored such that information received in the first channel during collection is transmitted in the second channel during transmission. This therefore requires a sequential writing of data to the RAM and random reading of the data in accordance with a predetermined connection pattern. Of course, the information is delayed by a single frame.

One of the disadvantages to a TSI system is that present day RAMs have a finite access time and capacity for writing of data to or reading of data from the RAM. Since the length of time for a given frame is defined by the T1 protocol, this provides a limitation for the amount of data that can be written to the RAM in a given frame and read from the RAM in a given frame. If the data to be switched exceeds this, it is then necessary to cascade a number of time matrices. This would be accomplished by interconnecting two time matrices with a space matrix which would result in a time-space-time matrix. This of course requires an additional frame of delay to go through the cascaded time matrix. This is a disadvantage from the time delay standpoint and also from the difficulties involved in interfacing the various matrices. These difficulties arise from the software involved in handling the switching configuration and also in the actual interconnection hardware.

The present invention overcomes the disadvantages of expanding a time matrix beyond the capabilities of the state-of-the-art access time for volatile memories to allow expansion of the system regardless of the access time of the memories.

SUMMARY OF THE INVENTION

The present invention disclosed and claimed herein comprises a digital bridge circuit for a time slot interchange digital switch matrix. The digital bridge has a storage medium for receiving all of the digital call signals from the switch matrix for storage thereof to provide a collection memory. A conference storage device is provided for storing a conference template that defines a plurality of conferences, each conference comprised of at least two conferees. The digital call signals are collected during a collection frame in the collection memory and, in a subsequent accumulation frame, the digital call signals associated with the conferees in the conference are accessed in accordance with a predetermined order. Summation circuitry is provided for sequentially summing the accessed digital call signals for each of the conferences and storing them as a single digital conference signal for each of the conferences in an accumulation memory. Transmit circuity is provided for outputting the digital conference signals to each of the associated conferees in the associated conference. In accordance with a predetermined format, the digital conference signal is output to the switch matrix for routing to the ports associated with the associated conferee.

In another embodiment of the present invention, echo cancelling circuitry is provided for subtracting the digital call signals associated with the receiving conferee from the digital conference signal. The digital call signal for the receiving conferee is accessed during transmission of the digital conference signal and subtracted therefrom during transmission of the digital conference signal to the receiving conferee.

In yet another embodiment of the present invention, the threshold level of each of the digital call signals is accessed from the collection memory to determine if the noise exceeds a predetermined threshold. If the noise does exceed the predetermined threshold, the digital call signal is inhibited from summation with the digital call signals for the remaining conferees in the conference to reduce the level of noise in the resulting digital call conference signal.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

System Overview

Figure 1:
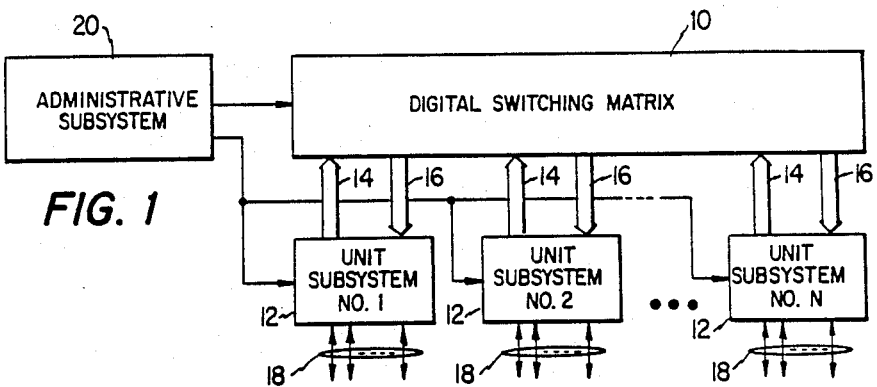
FIG. 1 illustrates a schematic block diagram of a general digital cross-connect system.

Referring now to FIG. 1, there is illustrated a schematic block diagram of a general digital cross-connect system. The cross-connect system is comprised of a digital switching matrix 10 which is interfaced with individual unit sub-systems 12 labeled "1" through "N", the interface being an ingoing bus 14 and an outgoing bus 16 for transfer of digital information therebetween. Each of the unit sub-systems 12 is interfaced with DSO channels 18 on each of the unit sub-systems, each of the sub-systems 12 having a plurality of DSO channels associated therewith.

The unit sub-systems 12 are operable to receive pulse-code modulation (PCM) information from the DSO channels and arrange this information in a channel type format where the processing is performed by the digital switching matrix 10. This arrangement will be described in more detail hereinbelow; however, this arrangement is conventional. The information is then transmitted to the digital switching matrix 10 for storage therein and retransmission to another one of the DSO channels 18 in the cross-connect matrix. The overall operation of this system is controlled by an administrative sub-system 20.

Digital transmission over a voice-grade line is accomplished with a T1 carrier system. In digitizing an analog signal for transmission along this type of carrier system, the signal is first sampled, quantitized and then encoded. The sampling rate is around 8 kHz which results in one sample every one hundred twenty-five microseconds. Analog information sampling is then encoded using pulse-code modulation (PCM) techniques, which is a common digitizing technique in use today. Utilizing the maximum capacity of a transmission system, 24 voice channels are transmitted together with time division multiplex (TDM) techniques. The T1 carrier system provides the multiplexing by sampling the 24 channels at a combined rate of 192,000 times per seconds (8,000 times per second per channel $\times$ 24 channels = 192,000). In each frame, there are 24 separate time slots with each slot being occupied by 8 bits, each 8 bit segment representing a PCM word representing an analog value for that particular sample of that particular channel. The frame therefore contains one sample for each channel plus an additional bit for frame synchronization. Thus, the complete frame is 193 bits (8 bits per channel $\times$ 24 channels + 1 sync bit = 193). Since the frame represents only one of the required 8,000 samples per second, a T1 system operates at 1.544 megabits per second to accommodate all 8,000 frames (193 per frame $\times$ 8,000 frame = 1.544 M). Each sample in the frame has a TDM slot of 5.2 microseconds.

Conventional digital hierarchy provides five levels of digital data rates that can be combined to form various channel banks and multiplexers. These levels are referred to as the "T" carriers with T1 carrier having a transmission rate of 1.54 MBit/second with 24 PCM voice channels, the T1C carrier having a transmission rate of 3.152 MBit/S providing 48 PCM voice channels, the T2 carrier having a transmission rate of 6.312 MBit/S providing 96 PCM voice channels, the T3 carrier having a transmission rate of 44.736 MBit/S providing 672 PCM voice channels and the T4M carrier having a transmission rate of 274.176 MBit/S and providing 4032 PCM voice channels. For the purposes of the present application, only T1 transmission will be discussed. However, it should be understood that any type of transmission can be facilitated in the present invention.

Digital Matrix

Figure 2:
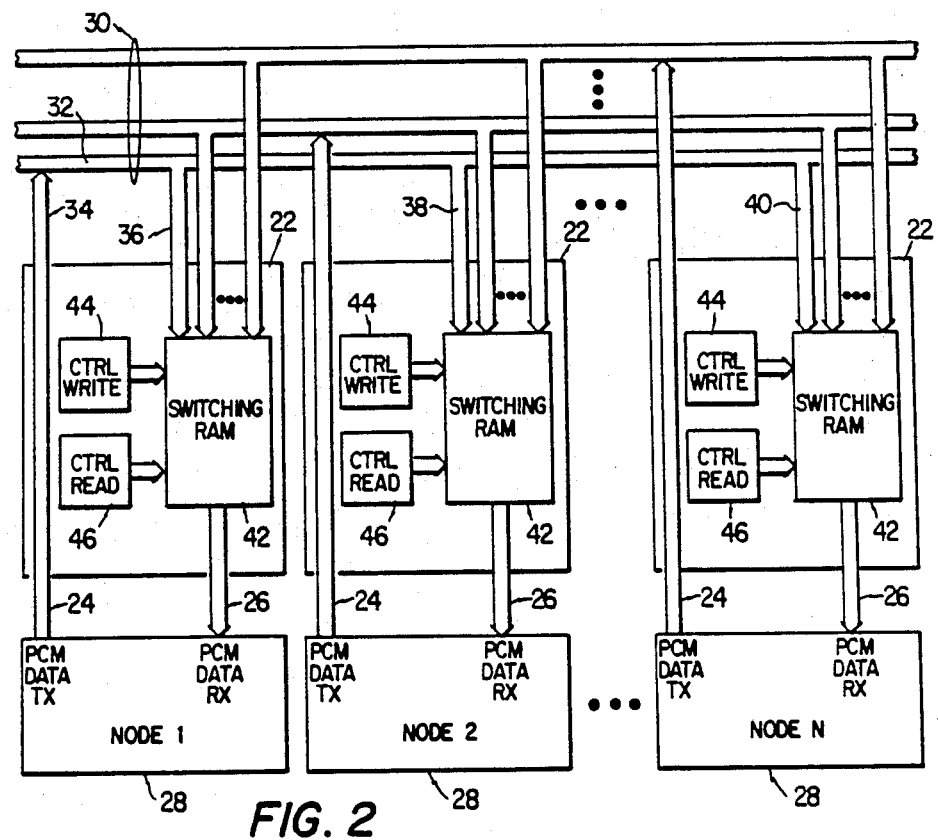
FIG. 2 illustrates a block schematic block diagram of a digital matrix utilizing the present invention in a time slot interchange format.

Referring now to FIG. 2, there is illustrated a schematic block diagram of a digital matrix utilizing the present invention in a time slot interchange format. The system is made up of a plurality of digital matrix modules 22, each module having an input data bus 24 for receiving PCM input data and an output data bus 26 for outputting PCM data. Each of the input data buses 24 and 26 are interfaced with nodes 28 labeled "1" through "N". Each of the nodes is operable to receive information from a plurality of channels in accordance with the carrier transmission format (i.e. T1 transmission) and interface this data with the digital matrix module. This is a conventional format for time slot interchange.

Each of the digital matrix modules 22 has a predetermined capacity for receiving data on the input bus 24 and outputting data on the output bus 26. This information is input to the system for storage therein and switched information is then transmitted back to one of the nodes 28 through the associated one of the output buses 26. It is the rate of retrieval of information from storage and the time constraints of the transmission format that determines the capacity of the system, since only a finite amount of information can be input to the system for storage and retrieval. This cannot easily be cured by increasing memory because all of the information in a given collection frame must be accessible for output in any given time slot of a transmission frame to provide a non-blocking system.

In the present system, the T1 transmission format is utilized which provides for 24 channels. The 24 channels are sampled with a sampling rate 8 kHz. Therefore, each frame is 125 microseconds in duration with each frame operating with a time domain multiplex (TDM) time slot of 5.2 microseconds. The TDM time slots for the 24 channels hereinafter will be referred to as TDM time slots, $t_1$–$t_{24}$.

Once the system is synchronized with respect to the beginning and the end of a given frame, it is only necessary to ensure that information in a common time slot for successive frames from a given node 28 is placed onto the bus 24 in a predetermined order. In a like manner, during the same 5.2 microseconds duration for a given TDM time slot, information in that particular TDM time slot is output on output bus 26. If the digital matrix module required 5.2 microseconds to access a PCM word and output it, this would mean that during any given frame on 24 channels, information could be input to module 22 or output therefrom. As will be described hereinbelow this is determined by the parameters of the storage device. If the storage device could access information 28 times in a given TDM time slot, this would mean that 28 separate channels could be stored in each of the TDM time slots $t_1$–$t_{24}$.

For example, if the internal memory of an individual module were capable of accessing PCM information in a given channel 28 times in a given TDM time slot, each of the 24 TDM time slots, $t_1$–$t_{24}$, would provide the capability of holding or allowing storage of 28 channels of information. This would result in a total of 672 channels. The nodes 28 determine how this information is input to the digital matrix module 22 with respect to the frame. The information would be arranged in 28 "shelves", each shelf having 24 channels corresponding to the TDM time slots $t_1$–$t_{24}$. In the first TDM time slot $t_1$, the information corresponding to that time slot would be sequentially input to the bus 24 from each of the shelves such that 28 channels of information would be stored in the system during a given time slot and, in a similar manner, 28 channels of information would be output on bus 26 during the same time slot. In the next sequential TDM time slot, the next 28 channels are sequentially input from each of the shelves. Each TDM time slot requires that this transfer of the information from each of the 28 shelves be accomplished with 5.2 microseconds. Capacity can be expanded, of course, if more channels of information can be stored and accessed within the 5.2 microseconds. Therefore, the capacity of the system is determined by the length of the data word that must be input to or output from matrix module 22, the stored access time for reading or writing data and the duration of the TDM time slot.

Referring further to FIG. 2, each of the input buses 24 passes directly through the module and is connected to an intramatrix bus 30 which is a group of data buses, with one data bus in the intramatrix data bus 30 operable to receive data from only one of the digital matrix modules 22, but operable to output data to each of the digital matrix modules 22. For example, a data bus 32 in the intramatrix bus 30 is interfaced with bus 24 in the digital matrix module 22 associated with node #1 through a connecting bus 34. The data bus 32 is interfaced with the digital matrix module 22 associated with node #1 through an output bus 36, with the digital matrix module 22 associated with node #2 through an output bus 38 and with digital matrix module 22 associated with node #N through an output bus 40.

When information is transmitted to the system from node #1, information flows through the associated input bus 24 to connecting bus 34 for transmission to all of the digital matrix modules 22 associated with all of the nodes 28 in the system including the first node 28. In a similar manner, any information from any of the remaining nodes is transmitted to each of the digital matrix modules 22 in the system, resulting in all the information transmitted from the nodes 28 being stored in each of the digital matrix modules 22. When data is transferred from the digital matrix module 22 to the associated one of nodes 28, it is only necessary to fetch the desired information from internal storage in the associated digital matrix module 22. This results in a non-blocking system which does not require two levels of switching wherein information would be transmitted from another storage area in another digital matrix module across a common interconnecting bus to the digital matrix module associated with the respective node.

It is important to note that on retrieval of information from the system illustrated in FIG. 2 that information is written into each of the digital matrix modules 22 at n times the rate that it is written out. For a system with n nodes, n data words are input to the system at any given time with one data word output at each node for each data word input thereto. However, there are n−1 more data words input to each of the digital switch matrix modules associated with each of the nodes than can be output therefrom. The purpose of this is to allow access to every data word input to the system to provide a non-blocking system. If n data words were not stored locally at the nodes, some contention might arise when two nodes attached to separate digital matrix modules were accessing the same information in a given output time. The system of the present invention prevents this contention by writing all of this information in RAM in parallel at the same rate the data is output from a given node.

Each of the digital matrix modules 22 has a switching RAM 42 associated therewith that has the input thereof interfaced with the intramatrix bus 30 for receiving information therefrom for a Write operation and the output thereof interfaced with the output bus 26 for a Read operation. A control Write circuit 44 and a control Read circuit 46 is associated with each switching RAM 42 to control the Read and Write operation. Each of the switching RAMs 42 are comprised of parallel RAMs, each RAM associated with one of the data buses in the intramatrix data bus 30. This allows each of the RAMs in the switching RAM 42 to store only information received from one of the nodes. Therefore, there are N individual RAMs in each of the switching RAMs. The switching RAM 42 is operable to switch between the individual RAMs to select the data for output to the associated node.

For example, if information from node #N were to be transferred or switched to node #1, this information would be stored in the Nth RAM in switching RAM 42 associated with node #1 and this RAM would be interfaced with output bus 26. It is important to note that this switching takes place internally to the one of the digital matrix modules 22 associated with node #1 and did not require any access to information stored in the digital matrix module 22 associated with node #N.

When writing to the RAMs, information is sequentially input to the RAM such that it is arranged in a predetermined order during a "collection" frame. This results in all the information in all the channels of the system being stored in switching RAM 42. In the transmission frame, the control Read circuit 46 is operable to store a connection pattern that allows information from any channel to be transmitted to the appropriate location However, it may be necessary to change the TDM time slot (i.e., time slot interchange) to which this information is transmitted as the receiving location may be associated with a different time slot compared to the time slot of the information when it was collected. Of course, the transmitted information may be associated with the same time slot as when it was received in a collection frame, in which case no time slot interchange is required. However, this makes no difference, since all of the information is available in the switching RAM 42 from the previous collection frame for output on bus 26 during any TDM time slot in the transmission frame. Therefore, any channel information in the system that was stored in the collection frame is available for output to any given node from its associated switching RAM 42. The capacity of a given node 28, as described hereinabove, is determined by the number of parallel bits that are transmitted along output data bus 26 and the rate at which this data can be accessed from memory.

Cross Connect Switch with Bridge

Figure 3:
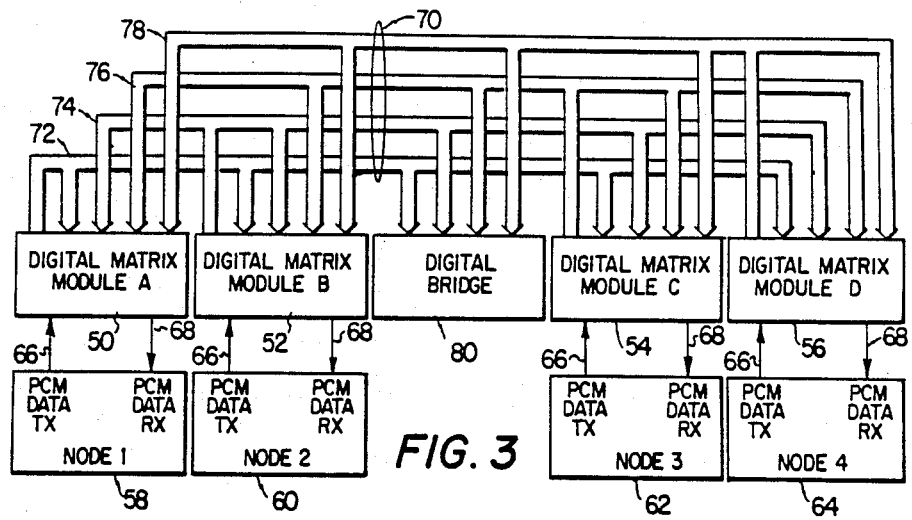
FIG. 3 illustrates a block diagram of the system of the preferred embodiment.

Referring now to FIG. 3, there is illustrated a block diagram of the system of the preferred embodiment. The system utilizes four digital matrix modules 50, 52, 54 and 56 labeled "A" through "D". Each of the digital matrix modules 50–56 are interfaced with nodes 58, 60, 62 and 64, respectively, each of the nodes 58–64 labeled "node #1–node #4", through PCM data buses 66 for inputting data to the associated module 50–56 and PCM data bus 68 for output of data from the associated one of the digital matrix modules 50–56. Each of the digital matrix modules 50–56 are interfaced together through an intramatrix bus 70. The intramatrix bus 70 is comprised of four separate buses 72, 74, 76 and 78. Intramatrix bus 72 is operable to transmit PCM data received from node 58 through digital matrix module 50 and disperse it to the internal switching RAM (not shown) of all of the modules. In a similar manner, bus 74 is operable to receive data from node 60 through digital matrix module 52 for dispersal to all of the digital matrix modules 50–56, bus 76 is operable to receive data from node 62 for dispersal to all of the digital matrix modules 50–56 and bus 78 is operable to received data from node 64 through digital matrix module 56 for dispersal to all of the digital matrix modules 50–56. In addition, all of the intramatrix buses 72–78 are input to a digital bridge 80, the operation of which will be described hereinbelow.

The system of FIG. 3 operates similar to the system of FIG. 2. That is, each of the digital matrix modules 50–56 receive data from the associated node and transmit it to all the modules including the module from which it originated for storage therein. Therefore, each of the digital matrix modules 50–56 have stored therein all of the information transmitted to the system from any of the nodes 58–64. In a like manner to that described above, extraction of data in the transmission frame is accomplished by accessing the internal switching RAM (not shown) in the associated one of the digital matrix modules 50–56 and outputting that accessed information. This is done without requiring interface with any of the digital matrix modules 50–56 in the system.

The digital bridge 80, as will be described more fully hereinbelow, is utilized in a conference or broadcast mode. In this mode, information on a number of channels is accessed from the internal switching RAM (not shown) in the digital bridge 80 and summed together for output to the other digital matrix modules 50–56 for storage therein. This allows a number of units to be combined in a single channel. Although not shown, the digital bridge 80 has one of the outputs thereof interfaced with one of the input PCM buses 66 to allow the summed data to be input back through the intramatrix bus 70 for storage in the switching RAM internal to both the digital matrix modules 50–56 and the digital bridge 80. This is done within the collection frame. During the transmission frame, this summed data output on one of the channel and stored in the switching RAM in the digital matrix modules 50–56.

Digital Matrix Module

Figure 4:
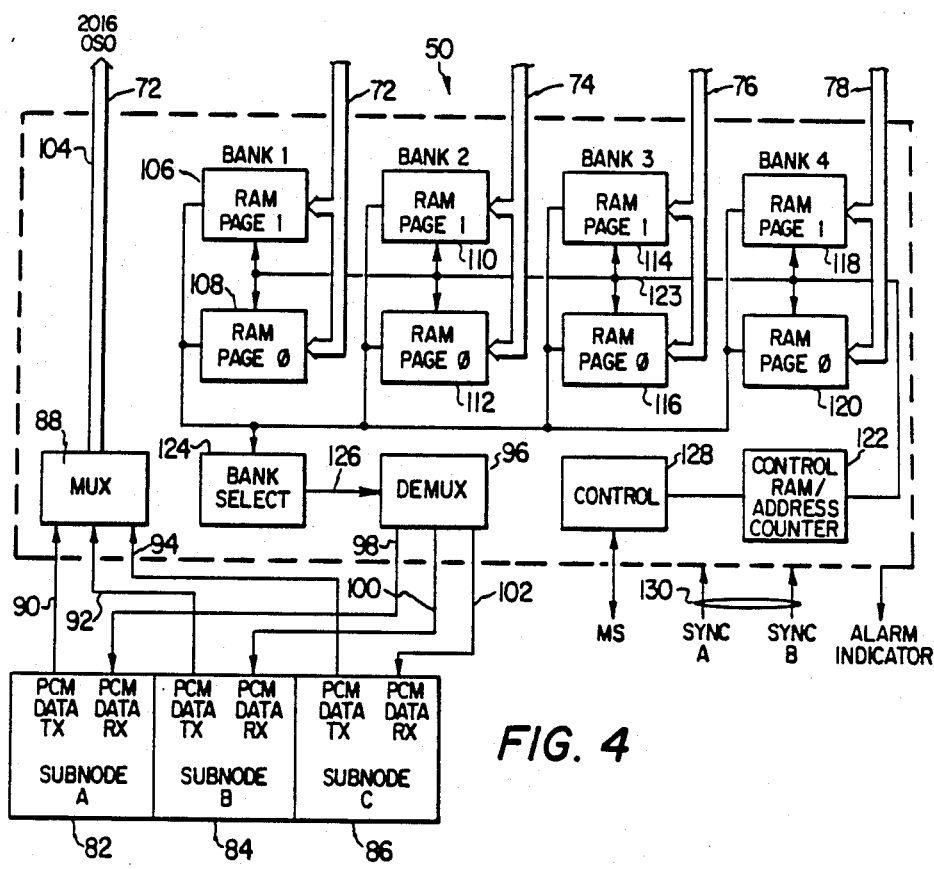
FIG. 4 illustrates a schematic block diagram of one of the digital matrix modules in the system of FIG. 3.

Referring now to FIG. 4, there is illustrated a schematic block diagram of the digital module 50 in the system of FIG. 3. Module 50 is representative of 52–56. In the preferred embodiment, each of the nodes 58–64 (FIG. 3) outputs 2,016 individual channels which are received from three separate subnodes in each of the nodes 58–64, each subnode outputting 672 channels. The separate channels utilize various multiplexing techniques to sequentially input the PCM data. This is a conventional technique.

Referring further to FIG. 4, the nodes 58–64 (FIG. 3) are each represented by a subnode 82, a subnode 84 and a subnode 86, labeled "subnode A–subnode C", respectively. The subnode 82 is interfaced with one input of a multiplexer 88 through a sixteen-bit wide data bus 90, subnode 84 interfaced with multiplexer 88 through a sixteen-bit wide data bus 92, and subnode 86 interfaced with multiplexer 88 through a sixteen-bit wide data bus 94. In a similar manner, data is received from a demultiplexer 96 and interfaced to the digital matrix module through sixteen-bit wide data buses 98, 100, and 102, respectively.

Each of the subnodes 82, as described above, outputs 672 channels of information within a given collection frame and also receives information on the same number of channels during the transmission frame. These channels of information are organized such that 28 channels of information are output in each of the 24 time slots $t_1$–$t_{24}$ in a given frame. Therefore, there are 28 separate "shelves" of information with each shelf of information having 24 channels each with each channel on a given shelf occupying the time space of one time slot $t_1$–$t_{24}$. For all three subnodes 82–86, 84 channels of information are output during each of the twenty-four time slots $t_1$–$t_{24}$ to provide a total of 2,016 channels of information. All three subnodes 82–86 output three channels of information at the same time with a multiplexer 88 sequentially sequencing through data presented by data buses 90–94 Therefore, in a single time slot $t_1$–$t_{24}$, the multiplexer 88 cycles twenty-eight times with twenty-eight separate channels of data presented in a sequential manner on each of the data buses 90–94 from subnodes 82–86, respectively. In a similar manner data is output from the demultiplexer 96 to subnodes 82–86.

The output of multiplexer 88 is connected to the bus 72 in the intramatrix bus 70 through an interconnecting bus 104, for output therefrom. The bus 72 is connected to the input of the switching RAM on all of the digital matrix modules 50–56. For example, the output of the digital matrix module represented in FIG. 4 is represented as being connected to bus 72 such that it is input to the digital matrix modules 50–56 on bus 72 with remaining buses 74–78 being connected to the remaining three buses in the intramatrix bus 70.

The bus 72 is input to a first bank of random access memories (RAM) comprised of a RAM 106 representing page 1 and a RAM 108 representing page 0. In a similar manner, the bus 74 is connected to a second bank of RAMs with a RAM 110 representing page 1 and a RAM 112 representing page 0. Bus 76 is input to a third bank of RAMs represented by a RAM 114 for page 1 and a RAM 116 for page 0. Bus 78 is input to a fourth bank of RAMs represented by a RAM 118 for page 1 and a RAM 120 for page 0. Each of the RAMs 106–120 are controlled by a control RAM/Address counter 122 which is interfaced with each of the RAMs 106–120 through a control line 123.

Each of the RAMs in each of the banks is interfaced with a bank select circuit 124 for selecting the output of one of the RAMs 106–120. In operation, in each bank one of the RAMs 106–120 is addressed for writing during the collection frame while the other RAM is operable to output data to the bank select circuit 124 in the transmission frame. These operations occur simultaneously. The bank select circuit 124, after selecting an appropriate output, connects one of the RAMs 106–120 to a demultiplexer 96 through a line 126. The entire system is interfaced through an MS line and control circuitry 128 to the main system to receive signals therefrom. In addition synchronization signals are provided for system timing on lines 130.

In operation, the system operates in a collection mode and a transmission mode. In the collection mode, information is received from each of the subnodes 82–86 and this information is output on bus 104 to bus 72 and, subsequently, input to one of the RAMs in each of the digital matrix modules 50–56. In addition, the remaining digital matrix modules in the system output information on buses 74–78. As described above, during each time slot $t_1$–$t_{24}$, twenty-eight channels of information are collected and sequentially transmitted.

During this collection frame, one of the RAMs 106–120 in each bank for either page 1 or page 0 is designated as the RAM for storing collection information therein. This data is then sequentially stored in the designated RAM. For example, if page 0 is designated as being the RAM to which collected data is to be stored, information transmitted from bus 72 that is selected by multiplexer 88 is input through bus 72 to RAM 108 in digital matrix module 50. During an entire collection frame, 2,016 channels of information and twenty-eight channels for each of the twenty-four time slots ($t_1$–$t_{24}$) are stored in the RAM 108. Therefore, the RAM 108 must be capable of accessing and storing the information at this rate. The storage rate of RAM 108 is typically one of the limiting factors of data switching. Since the time within which information is to be stored in any storage medium is defined by the protocol of the system, which in this embodiment is the $t_1$ transmission system, more information can be processed by either utilizing a faster RAM or utilizing more complicated circuitry to buffer information for later storage. However, the latter requires more circuitry and may incur more delay between collection and transmission of data.

After the data is collected in page 0, the control circuit 123 in a subsequent frame redesignates the collection RAM as the page 1 RAM. Therefore, all data collected in the subsequent frame and output on bus 72 is input to page 1 RAM 106. During this subsequent frame, the RAM 108 for page 0 is designated as the output RAM. If information to be output on any of the data buses 98–102 to subnodes 82–86 is contained in RAM 108, this information is output from RAM 108 to bank select circuit 124 and to demultiplexer 96. In, a similar manner, all of the page 0 RAMs 112, 116 and 120 in banks 2–4 are designated as the output RAMs for transmission of data therefrom.

During the collection frame, data is arranged in the RAM in a sequential manner. This is accomplished by sequentially incrementing the address in each of the RAMs designated as collection RAMs for each storage location therein. Typically, the number of storage locations will equal the maximum amount of data that can be collected and transmitted to the RAM during a given frame. For example, during the $t_1$ time slot, all twenty-eight channels of information output from subnodes 82–86 would be sequentially input to the RAM followed by the twenty-eight channels of information output during time slot $t_2$, etc. There would therefore be twenty-eight channels of information corresponding to time slot $t_1$, twenty-eight channels of information corresponding to time slot $t_2$ and so on for all twenty-four time slots, $t_1$–$t_{24}$. However, it should be understood that all of the information in the system in a given frame is sampled and stored during a given time frame at each of the digital matrix modules 50–56. It is only necessary during the transmission frame that the information be received at the final destination in this time frame. Therefore, the information can be transmitted back from the system in a different one of a time slots $t_1$–$t_{24}$ as long as it is in the proper time frame.

During transmission, the control RAM/Address counter 122 has stored therein in the memory portion a connection pattern. This connection pattern is a sequence of addresses for addressing the RAMs 106–120 in a random mode that is determined by the sequence. In addition, the control circuitry of the system controls the bank select circuit 124 to output the appropriate information.

For example, if a remote point A transmits information to multiplexer 88 from the first of the twenty-eight channels of the time slots $t_1$, it occupies the first memory location in the collection RAM. A remote point B, on the other hand, may transmit information in the first of the twenty-eight channels in the second time slot $t_2$. This information would be stored in the 29th storage location in the collection RAM. Therefore, remote point A would have information stored in storage location 1 and remote point B would have information stored in storage location 29. The storage location is a function of the sequence of transmission to the multiplexer 88. This is determined by circuitry in subnodes 82–86 and the sequence of operation of multiplexer 88.

During transmission, it may be desirable to transmit information between remote points A and B. When receiving information that is output from demultiplexer 96, subnodes 82–86 operate in a similar manner to that when transmitting information to the multiplexer 88. That is, information is presented to multiplexer 88 at a predetermined rate during each time slot. During the same period of time, information can be received by that particular channel from the mulitplexer 96.

For example, remote point A would present information to multiplexer 88 during the initial portion of time slot $t_1$. During that time, demultiplexer 96 would also output information for transmission from the system to the remote point A. Subnodes 82–86 would effect the connection between remote point A and the multiplexer 88 and demultiplexer 96 of the system of FIG. 4 during that period of time. Therefore, the control RAM/Address counter 122 must first of all select the appropriate bank and the appropriate storage location during the time in which the remote point A is receiving information from the system. In the above example, this would require the 29th location in which information from remote point B is stored to be accessed and transmitted to the appropriate one of the subnodes 82-86 that is associated with remote point A during the time that information from remote point A is being stored in the collection RAM at storage location 1. In a similar manner, the control RAM/Address counter 122 is addressing the first storage location corresponding to collection information of remote point A for transmission to remote point B during the time that collection information from remote point B is being stored in storage location 29 in the collection RAM. Therefore, information is continually being stored in a sequential manner in the collection RAM and, in a subsequent frame, the collection RAM being designated a transmission RAM and the information randomly accessed in accordance with the predetermined interconnect pattern in control RAM 122 for output in a different time slot if necessary.

In actuality, the information in a given frame in the present embodiment is stored in one of 2,016 individual time slots with the bank select circuit 124 and the control RAM/Address counter 122 providing a sequence to randomly output the information in any one of the 2,016 individual time segments during the transmission mode. This results in only one frame of delay between the collection of data on any given channel in any time slot for transmission of data back to the receiving one of remote points. As described above, 111 the information in this system is available in any one of the digital matrix modules. It is only necessary to store the appropriate sequence in the control RAM/Address counter 122 to associate it with the digital matrix module 50 to provide the appropriate output to the associated ones of the subnodes 82-86. Since all the information in the system is available, it is not necessary to go through an intermediate node in the system, thus resulting in a "non-blocking" system. That is, no path is ever blocked since all paths are available for access from any given one of the digital matrix modules. This is the result of distributing the information for storage locally rather than providing a central storage system which must transfer information over a switched path for output from the system. Additionally, any number of digital matrix modules can be accommodated as long as each digital matrix module has a dedicated bank of RAMs associated with that particular digital matrix module for storing a given frame of information therein.

Detailed System Operation

Figure 5:
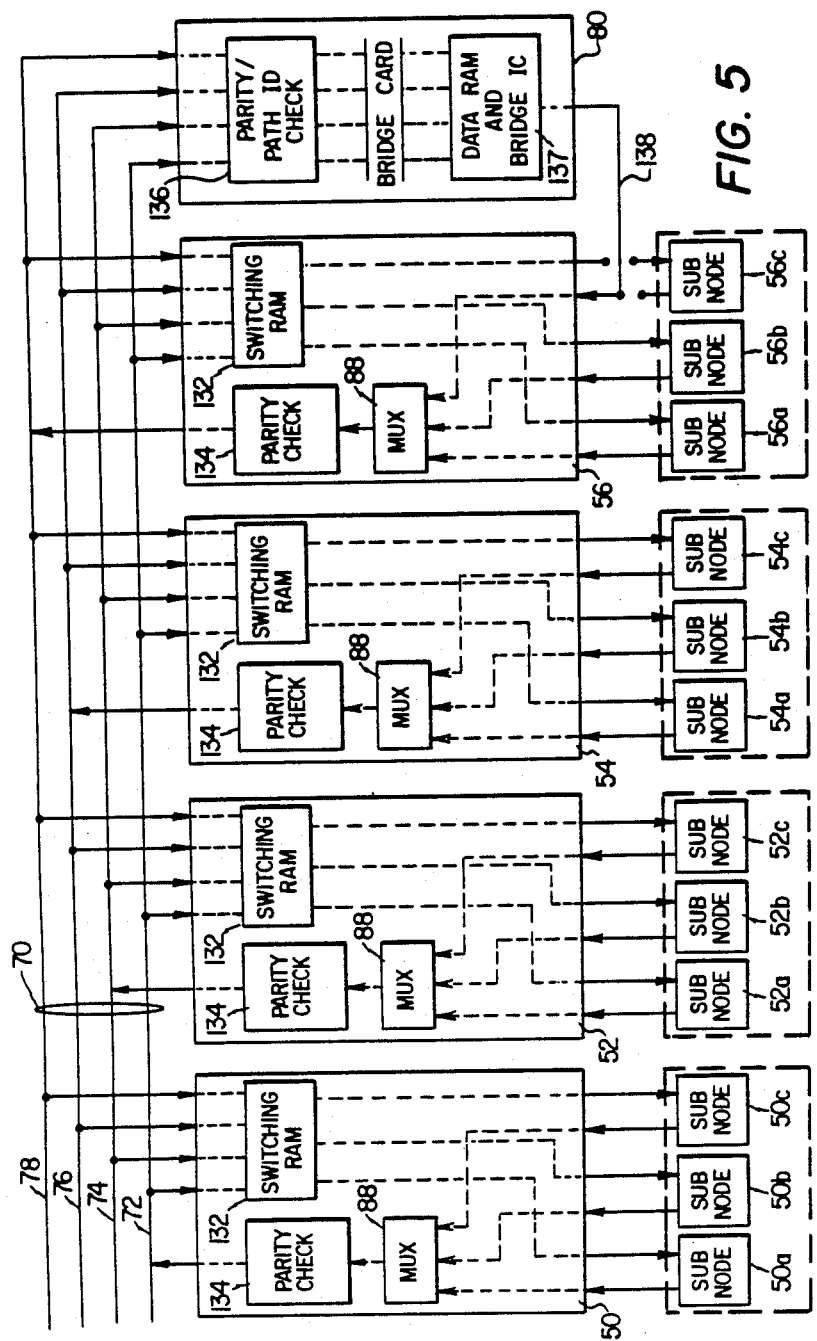
FIG. 5 illustrates a schematic block diagram of the multiplexer in one of the digital matrix modules in the system of FIG. 3.

Referring now to FIG. 5, there is illustrated a more detailed schematic block diagram of the system of FIG. 3, illustrating the multiplexer 88 in each of digital matrix modules 50-56 interconnected with three subnodes each. The subnodes are noted by the lower case reference numerals a-c with the subnodes connected to digital matrix module 50 labeled 50a, 50b and 50c. The four banks of RAMs are represented in general by a box labeled "switching RAM" 132. Each of the multiplexers 88 is connected through a parity check circuit 134 for output to the associated one of the buses 72-78 in the intramatrix bus 70 with each of buses 72-78 interfaced with a switching RAM 132 in each of the digital matrix modules 50-56, as described above with reference to FIG. 4. The parity check circuits 134 are operable to check parity on the data received from the multiplexer 88 and provide an alarm signal (FIG. 4) if parity is not present.

Each of the subnodes associated with each of the digital matrix modules 50-56 are operable to output 16-bit data at a rate of 5.376 megahertz. This data is sampled at three times that rate or at a rate of 16.128 megahertz. Therefore, 16-bit data words are output to the associated one of the buses 72-78 at a rate of 16.128 megahertz. This is the rate at which this information must be switched into the switching RAM 132 in each of the modules 50-56. The capacity of the system, as described above, is limited by the rate at which a data word can be stored in the switching RAM. If, for example, the switching RAM could store data at twice the rate of that illustrated in the present embodiment, three additional subnodes could be added to a given digital matrix module, each outputting 16-bit data words at a rate of 5.376 megahertz and the multiplexer 88 operating at a rate of 32.256 megahertz. However, this is merely a design change and defines the capacity of a given digital matrix module. It is important to note that the capacity of the system is a function of the way in which data can be stored during a single frame since each bank of the RAM associated with each of the digital matrix modules has a capacity which equals or exceeds the information being input to the digital matrix module. Further, by disposing in each of the digital matrix modules an associated bank of memory for each of the digital matrix modules, it is therefore possible to have local access to all the information in the system.

For example, with the present system, information transmitted from subnode 50a is stored in each of the switching RAMs 132 and each of the digital matrix modules 50-56. If a remote point associated with subnode 54c is to receive information from subnode 50a, it is only necessary to provide a predetermined output pattern in the switching RAM 132 associated with digital matrix module 54 to effect transfer of information collected from subnode 50a and stored in switching RAM 132 in digital matrix module 54 to subnode 54c. If information were not locally stored in each of the switching RAMs 132, it would therefore be necessary for a path to be provided between digital matrix module 54 and the storage location where the information from subnode 50a is stored and a time slot interchange performed. This would require a data link from the storage location to subnode 54c. If a centralized storage location were utilized, it would be necessary to provide a data link from the module 54 to the centralized storage location. It is important to note that in the present invention, no data link is required between any of the digital matrix modules 50-56 to effect transfer of information to the associated subnodes since all the information is available at each of the digital matrix modules 50-56 from all of the subnodes in the system.

Digital Bridge

The digital bridge 80 has the four intramatrix buses 72-78 input thereto and processed through a parity/path ID check circuit 136, the output of which is input to a data RAM and bridge IC 137 for storing information and providing a summation operation. The summation operation involves selectively accessing a number of channels for summation thereof into a single channel with this channel being output from the data RAM and bridge IC on an output line 138. This line is then input to one input of the system. In the embodiment of FIG. 5 this is illustrated as the input to the input that would normally be occupied by subnode 56c with subnode 56c being disconnected from the system. Therefore, the available number of input channels for connection to remote points would be decreased by the number of input channels occupied by subnode 56c. In the preferred embodiment, this is 672 channels. The line 138 therefore represents a total of 672 output channels such that the bridge circuit 80 can combine any number of the 8,064 channels stored in the data RAM in bridge IC 137 (2016 channels on each of the four intramatrix buses 72–78) for output on one of 672 channels.

The data RAM and bridge IC 137 of the digital bridge 80 has contained therein four banks of data RAM. Each bank of RAM can hold data from 2,016 DSO channels with one data RAM associated with each of the intramatrix buses 72–78. The bridge IC can select up to 2016 channels from storage in the digital bridge and internal bank select circuit (not shown). The received channels are summed together as directed by control information from the external system processor and control circuits. The channels can be summed into a single output and the desired configuration for up to 672 outputs. These outputs, described above, are input to one of the digital matrix modules 50–56 to allow cross-connection to the system from 1 to 672 channels. If the maximum number of channels output by the digital bridge 80 are input to one of the digital matrix modules 50–56, this results in 7392 separate channels that can be cross-connected or bridged via the digital bridge 80.

There are a number of operations that are available with the digital bridge 80. They are broadcast bridging, split-bridging and conferencing bridging. Broadcast bridging is a situation where one input channel is broadcast (distributed) to multiple output channels. The source (master station) can communicate with multiple receivers (slave stations). However, the slave stations cannot communicate with the master station or any other slave station. An example of this type of bridging is the transmission of stock market information from one location (master station) to brokerage houses, news services, and other subscribers (slave stations). The communication is one way only, from the master station to the slave stations. To effect broadcast bridging, it is only necessary to store the information from the master station into a given channel and control each of the connect patterns to interface the slave stations with that particular storage location that is occupied by the data from the master station.

In the split-bridge, multiple channels are collected (summed) to a single channel and a single channel is broadcast to multiple channels. A split-bridge provides bidirectional channels between a single master station and multiple slave stations. The master station can transmit to all slave stations and receive from any slave station. A slave station cannot communicate with another slave station on a split-bridge. An example of split-bridging service is the interconnection of automatic teller machines to a central computer. The central computer (master station) can transmit to all of the automatic teller machines (slave stations) and receive from any of them. The automatic teller machine can only communicate with the central computer.

To effect a split-bridge connection, it is necessary for the transmissions from each of the slave stations to be summed in a digital bridge 80 and then output to a single channel. This single channel is then interconnected to the receive input of the master station. In a similar manner, the master station transmission is stored in a single storage location and the associated bank in each of the digital matrix modules 50–56 and each of the slave stations is then linked to this storage location.

Conference bridging is where multiple channels are interconnected so that all can communicate with each other simultaneously. A conference bridge provides bidirectional channels between multiple locations. There is not a master station/slave station relationship. An example of conference bridging service is in-house tele-conferencing where various participants at different locations are interconnected to a conference bridge. Each participant can communicate with any or all other participants.

Figure 6:
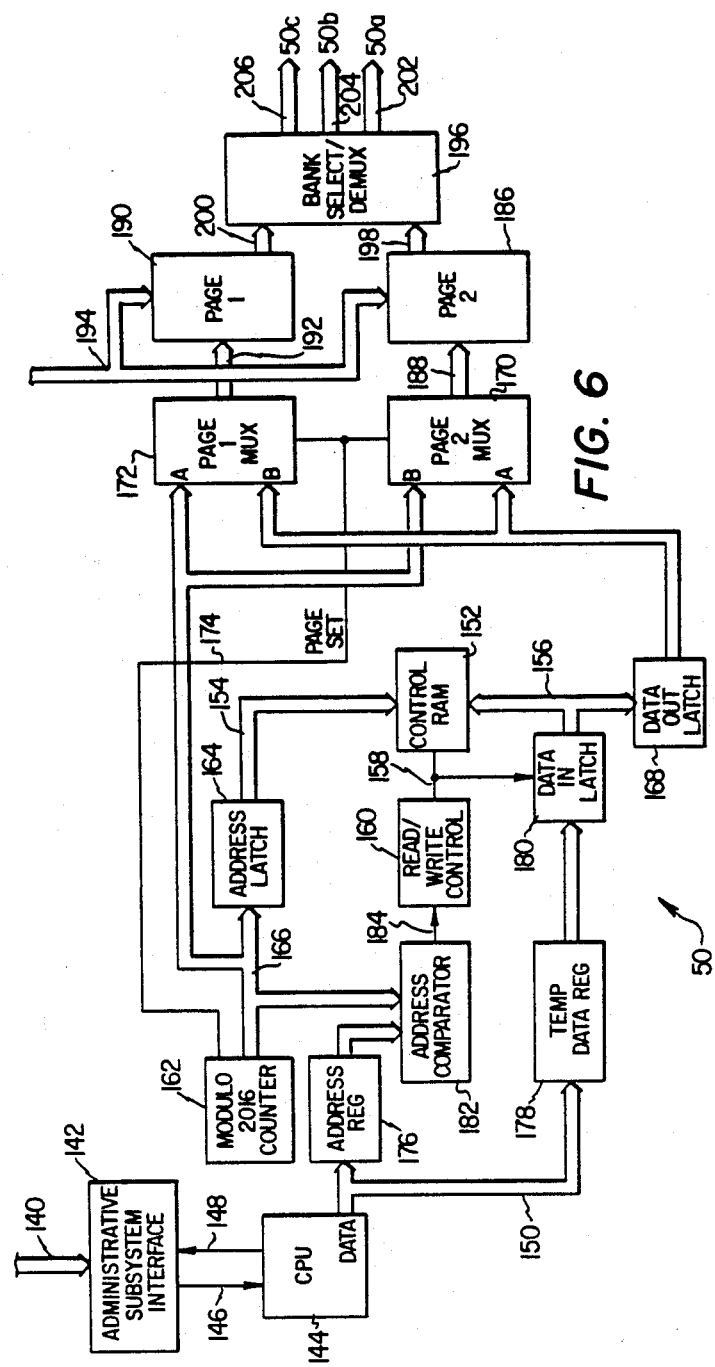
FIG. 6 illustrates a schematic block diagram of the digital matrix modules.

To effect a conference bridge with bidirectional communication, it is necessary to sum all of the channels in the conference in the digital bridge 80 into a single channel for storage in switching RAM 132. However, one disadvantage to conference bridging is that the transmitting station can have a feedback problem if it receives a signal comprised of the sum of all other channels and its own channel. It is desirable to cancel or significantly attenuate the receiving channel's own transmission. The digital bridge 80 is operable in the bridge IC 137 to sum all of the channels in the conference to provide a summed signal. The transmission from one of the receiving stations is then subtracted from the summed signal and output on one of the 672 channels on line 138 for storage in switching RAM 132 in all of the digital matrix modules 50–56. This channel is then interconnected with the station associated with the subtracted signal. For each of the stations in another conference, a similar operation is performed such that each of the stations receives a summed signal with its own individual contribution subtracted or significantly attenuated. Therefore, during a transmission cycle, all of the summed information for each station in the conference is stored in switching RAM 132 in each of the digital matrix modules 50–56 with one storage channel being designated for transmission to the associated one of the conference stations. The storage location is determined by the input port to which the digital bridge 80 is interfaced. The connection pattern can then select the address with the aid of the bank select circuits for the appropriate storage location for output to the appropriate one of the conference stations Referring now to FIG. 6, there is illustrated a schematic block diagram of the digital matrix modules 50–56. All reference numerals refer, for illustrative purposes, to digital matrix module 50. The digital matrix module interfaces with the administrative subsystem through a serial interface bus 140 which provides a number of control lines. One control line is a serial data line which is a 19.2 kBaud serial communication line. This serial bus is input to an administrative subsystem interface circuit 142 which provides buffering for output data to a CPU 144 on a serial line 146 and to receive data from the CPU 144 on a serial line 148. The CPU 144 is comprised of a microprocessor of the type HD6303R1P manufactured by Hitachi. This microprocessor has a serial input for receiving serial data and transmitting serial data out and converting received serial data to parallel data for transmission internally to the digital matrix module. Data is transmitted to the system on a processor data bus 150 which in one mode carries address information which is supplied by the administrative subsystem. These addresses are provided on a block basis such that each digital matrix module is supplied with a group of addresses for updating the internal memory, the internal memory utilized for storing the interconnect pattern.

At the heart of the digital matrix module is a block of control RAMs 152. Control RAMs 152 are comprised of four banks of control RAMs. Each bank of memory is comprised of 4K bytes of memory for storing 2016 sixteen-bit data words. Address information is received by control RAM 152 on an address bus 154 and data information is written to and read out of the control RAM 152 on a data bus 156. The location to which data is to be stored in or read from is determined by the address on address bus 154 and Read/Write control information on a control line 158 which is interfaced with a Read/Write control circuit 160. Control RAM 152 is comprised of 16K of Static RAM. The Control RAM 152 is operable to store an interconnect pattern for the digital matrix module which essentially consists of addresses for the four banks of memory for the first and second page, as will be described hereinbelow. In the preferred embodiment, the control RAM 152 is comprised of two static random access memory (SRAM) integrated circuits of the type CY7C128 manufactured by Cypress Semiconductors. Each of these devices receives an eleven-bit address word on the address bus 154, each outputting eight bits of data to form a sixteen-bit data word. The control RAM 152 is fabricated from individual static RAMs that receives an eleven-bit address word on the input thereof and outputs a eight-bit data word, each page of memory in each of the banks being comprised of two 2018 data memories.

The control RAM 152 operates in two modes, it is either written to the memory or read therefrom. The memory is operated in a synchronous manner such the addresses on the bus 154 are stepped through in a sequential manner. The addresses are generated in a modulo 2016 counter 162 which is comprised of three 74ALS163 four-bit synchronous counters which are connected in parallel to output an eleven-bit address which is initially reset at zero and then sequentially counted up to a range of 2015 by a sixteen megahertz clock. The output of the counter 162 is input to an address latch 164 through an address bus 166, the output of address latch 164 connected to bus 154 for providing the address information to the control RAM 152 For each collection or transmission frame, the address on the input to the control RAM 152 is sequenced through one complete cycle. In the next frame, the counter 162 is reset and the count is begun over.

Data output from the control RAM 152 is placed onto bus 156 and then into a data out latch 168, the output of which is interfaced with the A-input of a multiplexer 170 for providing address information for page two of the memory and to the B-input of a multiplexer 172 for providing address information for page one of the memory. The multiplexers 170 and 172 have the remaining inputs thereof connected to the address bus 166 from the counter 162. Therefore, the multiplexers 170 and 172 are operable to receive an address from the data bus 156 or from the counter 162 As described above, the digital matrix module in the collection frame stores information in the switched RAM in a sequential manner and reads information from the switching RAM in a random mode in accordance with the interconnection pattern. This interconnection pattern is stored in the control RAM 152. A page select signal determines whether the sequential address information is output from the multiplexers 170 or 172, this signal received on a line 174 which is interfaced with the counter 162. The counter 162 is comprised in part of a programmable array logic circuit and a flip-flop to distinguish between subsequent frames for both collection and transmission. This allows page one in a first frame to be the collection frame and page two the transmission frame, and in a subsequent frame controls page one to be the transmission frame and page two to be the collection frame. This alternates for all subsequent frames.

To update the control RAM 152, it is necessary to "Write Over" information in the RAM 152 "on the fly"; that is, information is written into the RAM during the dynamic operation of the system such that data is continually output on bus 156 for storage in data out latch 168. This is facilitated by storing the address of the control RAM 152 in an address register 176, the stored address representing the location in control RAM 152 to which new address information is to be stored. This new address information is then stored in a temporary data register 178, the output of which is input to data in latch 180. The address register 176 is interfaced with an address comparator 182 is, address comparator 182 also interfaced with bus 166 on the output of counter 162. Address comparator 182 is operable to compare the output of the counter 162 with the contents of address register 176 and output a signal on line 184 whenever there is a true comparison. Line 184 controls a Read/Write control circuit 160 to latch data that was stored in the temporary data register 178 into the data in latch 180 and also place the control RAM 152 in the Write mode. The data latched into data out latch 168 is received from the data in latch 180 and this information is also stored in the control RAM 152 at the address that was stored in address register 176. Therefore, data to be stored in the control RAM 152 is provided by the CPU 144 and output to the switched RAM memory and also stored in the control RAM during the same time. This allows updating of control RAM 152 without requiring a separate update cycle.

The output of multiplexer 170 is input to a block of memory 186 on a bus 188, which memory is comprised of page two of memory. The block of memory 190 which is interfaced with multiplexer 172 through address bus 192 comprises page one of the memory. Data is received from the intramatrix bus 70 on a sixteen-bit data buses 194. The output of memories 186 and 190 are input to a bank select/demultiplexer circuit 196 through buses 198 and 200, respectively. Bank select/demultiplexer circuit 196 selects both the bank of memory from which data is to be output and also one of the three subnodes 50a, 50b, and 50c to which the information is to be transmitted. The subnodes are interfaced with the bank select/demultiplexer circuit 196 through buses 202, 204 and 206. As described above, each of the buses 202 is a sixteen-bit data bus and provides 672 channels worth of information during any given frame.

Figure 7:
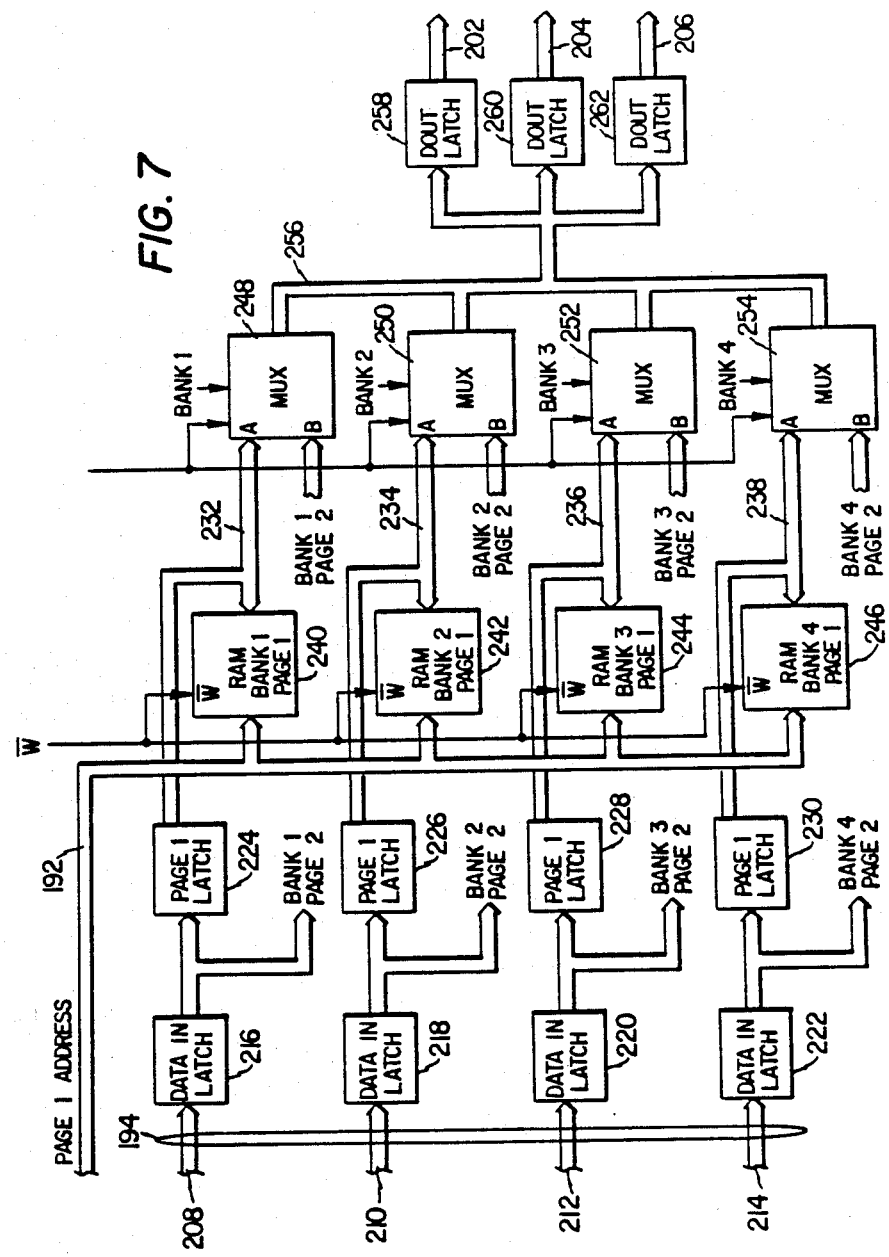
FIG. 7 illustrates a schematic block diagram of the memory block for page one of the memory.

Referring now to FIG. 7, there is illustrated a schematic block diagram of the memory block 190 for page one. As described above, each block of memory is comprised of four banks of data, one bank for each of the digital matrix modules 50–56 in the system. If additional digital matrix modules are utilized in the system, an additional bank of memory is utilized. Each bank of memory is comprised of two pages, one page of which is illustrated in FIG. 7. The four buses 194 that are interfaced with the intramatrix bus 70 are comprised of four individual sixteen-bit data buses 208, 210, 212 and 214, which buses are interfaced with data buses 72-78 of FIG. 5.

Data buses 208-214 are interfaced with data in latches 216, 218, 220 and 222, respectively. The outputs of latches 216-222 are input to page one data latches 224, 226, 228 and 230, respectively. In addition, data in latches 216-222 are also interfaced to page two latches (not shown) which are similar to the page one latches 224-230. The output of page one latches 224-230 are interfaced with intermediate data buses 232, 234, 236 and 238, respectively. Each of the data buses 232-238 is interfaced with the input a 32K RAM 240, 242, 244 and 246, respectively. Each of the 32K RAMs 240 is comprised of two 16K RAMs of the type 2018 manufactured by Toshiba Corp. for storing 2016 eight-bit words. One of the eight-bit RAMs is for storing the most significant bits and one is for storing the least significant bits.

Data buses 232-238 are interfaced with the A-input of multiplexers 248, 250, 252 and 24, respectively. The remaining input of the multiplexers 248-254 is interfaced with each of the banks of page two memory block 186. The output of each of the multiplexers 248-254 is interfaced with bank select bus 256, which is a sixteen-bit data bus for receiving the output of one of the multiplexers 248-254. In addition, the multiplexers 248-254 select only from page one or page two and not from both. Therefore, information is selected from one of the RAM circuits 240-246 of page one if page one is the transmission page during the transmission frame. Bus 256 is interfaced with three data output latches 258, 260 and 262, the outputs of which are interfaced with buses 202, 204 and 206, respectively.

In operation, data is first input to the data input latches 216-222 which are comprised of D-type flip-flops. The information then is either transferred to the page one latches 224-230 or similar type latches in the page two memory block 186. These latches are also D-type flip-flops. This transfer of data occurs when the particular page is selected in the memory to receive the data in the collection frame. In the collection mode, data is then transferred from the latches 224-230 to data buses 232-238, respectively, in the page one memory block 190. The Write Enable inputs of RAMs 240-246 are controlled to store data and the page one address line 192 is interfaced with the output of the counter 162 such that data is stored sequentially in the various memory locations in RAMS 240-246, as described above. In the collection mode, buses 232-238 are unselected by multiplexers 248-254, respectively.

In the transmission mode, the latches 224-230 are inhibited from latching information onto buses 232-238, respectively. RAMs 240-246 are placed in the Read mode and the address bus 192 is interfaced with the output of control RAM 152 for random access to the various memories. Multiplexers 248-254 are then controlled to interface the selected bank with the bank select output bus 256. Multiplexers 248-254 are comprised of a two-to-one multiplexer for multiplexing two sixteen-bit data buses onto one sixteen-bit data bus and three-state output latches which are controlled by bank select inputs.

Digital Bridge

Figure 8:
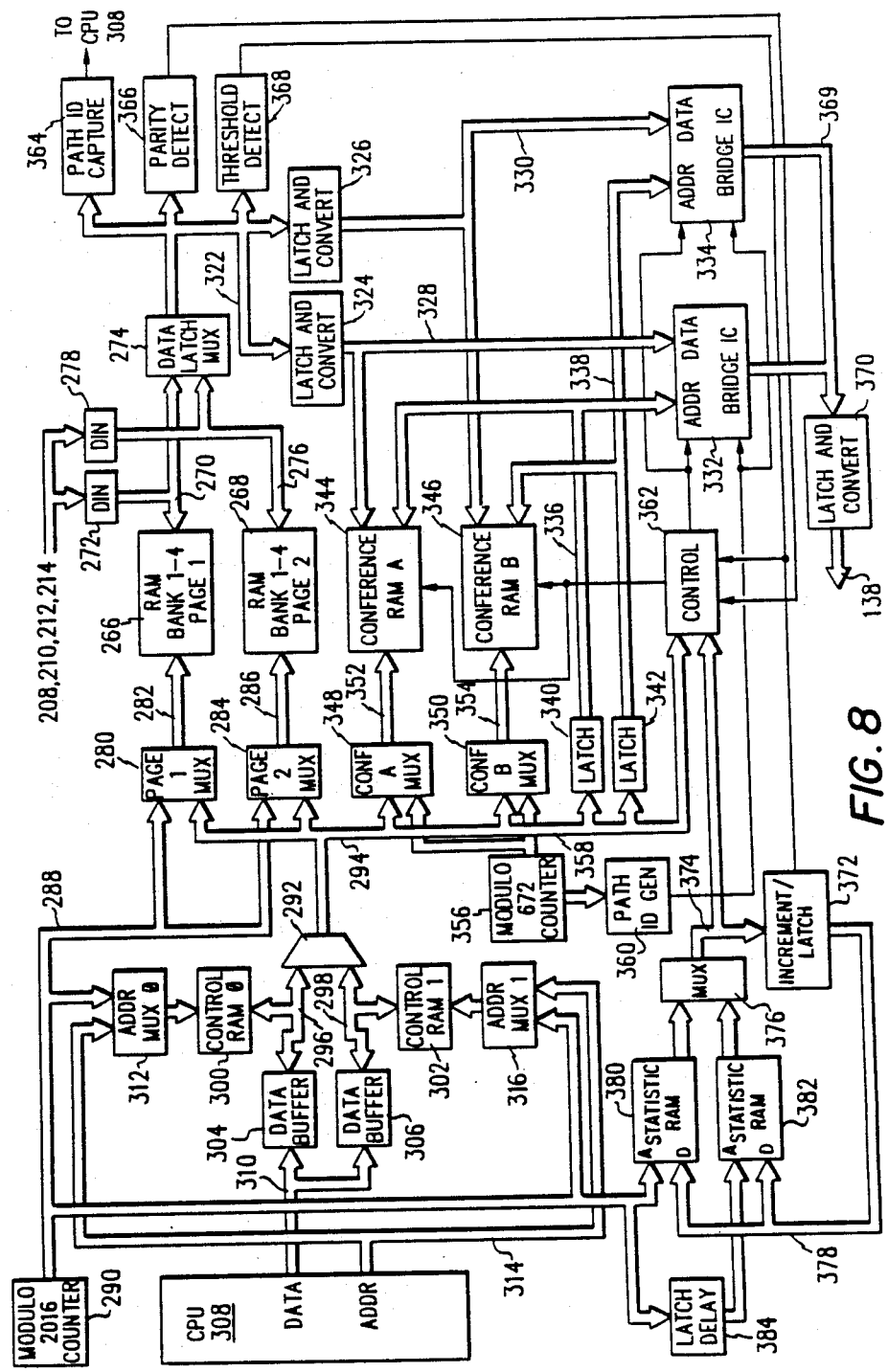
FIG. 8 illustrates a schematic block diagram of the digital matrix module for the bridge function.

Referring now to FIG. 8, there is illustrated a schematic block diagram of the digital matrix module utilized for the bridging function This is illustrated as the digital bridge 80 in FIG. 3 and FIG. 5. The digital bridge 80 utilizes four banks of RAMS similar to each of the digital matrix modules illustrated in the schematic block diagram of FIG. 6 and FIG. 7. There are two pages of RAMs for both page one and page two. The four banks of RAMs in page one are illustrated by a box 266 and the page two banks of RAM are illustrated by a box 268. A bidirectional bus 270 is interfaced with the data input of RAM bank 266 and also with data-in latch 272 and an output data latch multiplexer 274. In a similar manner, a bidirectional bus 276 is interfaced with the data port of the RAM bank 268 and also with a data-in latch 278 and the data multiplexer 274. The buses 270 and 276 carry the PCM data, which data is stored in the RAM bank 266. The address input of RAM bank 266 is interfaced with a page 1 multiplexer 280 through a bus 282 and the address input on the RAM bank 268 is interfaced with a page 2 multiplexer 284 through a bus 286. The data-in latches 272 and 278 are both interfaced with buses 208-214, as illustrated in FIG. 7.

The page 1 and page 2 multiplexers 280 and 284 each have two address inputs. One address input is connected through a bus 288 to a modulo 2016 counter 290 and the other input thereof connected to the output of a multiplexer 292 through a bus 294. The modulo 2016 counter 290 operates similar to the counter 162 in FIG. 6. In the Read mode, as described above with respect to the digital matrix modules, the counter 290 is operable to sequentially increment the addresses for the collection frames.

The multiplexer 292 has two inputs, one input thereof interfaced with a bus 296 and the other input thereof interfaced with a bus 298. The bus 296 is operable to receive data output by a control RAM 300 so the data output by the control RAM 300 can be transferred to bus 294. In a similar manner, the bus 298 is interfaced with the output of a control RAM 302. Selection of either of the control RAMS 300 or 302, in addition to selection of the appropriate bus 296 or 298, allows information stored in the control RAMs in the form of addresses to be output on bus 294 for input to the selected one of the RAM banks 266 or 268. It should be noted that only one control RAM 300 or 302 is selected for output to bus 294.

Buses 296 and 298 are also interfaced with data buffers 304 and 306, respectively, which have the inputs thereof interfaced with a CPU 308 through a bus 310. The CPU 308 has a data output thereof connected to bus 310 to allow data to be output from the CPU 308 for storage in one of the control RAMS 300 or 302. In operation, as will be described hereinbelow, one of the control RAMS 300 or 302 is operable to output data in the form of addresses to the bus 294 while the other of the control RAMs 300 or 302 is operable to have data stored therein for update purposes. Essentially, the data stored in both control RAMs 300 and 302 is identical, as will be described in more detail hereinbelow.

The address input of control RAM 300 is connected to the output of an address multiplexer 312. The multiplexer 312 has two inputs, one of which is connected to the bus 288 to receive the output of the counter 290 and the other input of which is connected to the address output of the CPU on a bus 314. In a similar manner, the address input of the control RAM 302 is connected to the output of an address multiplexer 316. The address multiplexer 316 has two inputs, one of which is connected to the bus 288 and the other which is connected to the address output of the CPU 308 through the bus 314. The control RAMs 300 and 302 are operable similar to the control RAMS 152 of FIG. 6, in that they have a sequence of addresses stored therein to allow random access of the RAM banks 266 and 268 during a transmission frame with the exception that the control RAMs 300 and 302 in the digital bridge cannot update "on the fly" as was the case with the digital matrix modules of FIG. 6. On the contrary, the control RAMS 300 and 302 operate on alternate frames to output stored addresses and data from one of the RAMs 300 or 302 while updating the stored addresses and data in the other of the control RAMs 300 and 302. This is necessary since a conference cannot be interrupted or updated on the fly.

Each of the control RAMs is operable to store both address data and control data. The control data is stored in the various fields. For example, the inbound address defining the location of data to be placed in a conference and the outbound addresses defining the outbound time slot from the bridge 80 are stored in two separate fields, path I.D. information is stored in a separate field, subtraction information is stored in a separate field, and an accumulator number is also stored in a separate field. The accumulator number represents the storage location in an internal RAM in which a conference is stored, which will be described hereinbelow.

When the control RAMs 300 or 302 output data, the entire field of data is output onto the bus 294 with the inbound address information going to the RAM banks 266 and 268. The addresses are stored such that the conferees in a given conference are output in a sequential manner. For example, if three conferee's "A", "B", and "C" were in a conference, the address locations in the RAM banks 266 and 268 corresponding to these three conferees would be stored in adjacent memory locations such that three increments of counter 290 on the address inputs of control RAM 300 or 302 would cause the data for these three conferees to be sequentially output from RAM banks 266 or 268.

The data output from the data latch multiplexer 274 is input to a bus 322 which is then input to one of two latch/converter circuits 324 or 326, respectively. The latch/converter circuits 324 and 326 are each operable on different frames to store PCM data output by the RAM banks 266 and 268. The latch/converter circuits 324 and 326 are operable to receive either μ law Alaw data. If μ law data is received, these latch/converter circuits 324 and 326 are not necessary. However, in some European countries, a different format is utilized and these circuits are necessary.

The outputs of the latch/converter circuits 324 and 326 are interfaced with bidirectional buses 328 and 330, respectively. The bus 328 is input to the data input of a bridge IC 332 and the bus 330 is interfaced with the data input of a bridge IC 334. Each of the bridge ICs 332 and 334 have the address inputs thereof connected to a bus 336 or 338, respectively. The addresses determine an internal accumulator location. The address buses 336 and 338 are connected to the output of address latches 340 and 342, respectively. The inputs of latches 340 and 342 are interfaced with bus 294 to receive the accumulator address numbers which are stored in the accumulator field of the data output by the selected one of the control RAMs 300 or 302.

The bridge ICs 332 and 334 are operable during an accumulation frame to accumulate the data for all of the conferees in a particular conference in accordance with a predetermined accumulator number or address. For example, the selected control RAM 300 or 302 would be controlled to output the inbound addresses for time slots associated with the three conferees "A", "B" and "C". Each of these locations would provide the data associated with the particular conferees which would also have associated therewith the same accumulator number. This accumulator number would be input to one of the bridge ICs 332 or 334 and data on three successive cycles of accessing the banks 266 or 268 would be stored in this accumulator location internal to the selected one of the bridge ICs 332 or 334. This would occur during a single frame which is referred to as the accumulation frame. On the next frame, this information would be output and the other of the bridge ICs 332 or 334 would be placed in the accumulation mode. Therefore, it can be seen that there is a collection frame for collecting data for storage in the RAM banks 266 or 268 and then an accumulation frame for transmitting stored information from the RAM banks 266 or 268 to the accumulating one of the bridge ICs 332 or 334. This is followed by a transmission frame for transmitting the accumulated information from one of the bridge ICs 332 or 334 out to the switch matrix. It should be understood that one of the RAM banks 266 or 268 is always in the collection mode with the other being in the output accumulation mode, whereas one of the bridge ICs 332 or 334 is in either the accumulation mode or the transmission mode.

In order to provide an Echo Cancelling function, data for each of the conferees is stored in one of two conference RAMs 344 and 346 at the same time that it is accumulated in the accumulating one of the bridge ICs 332 or 334. The information is stored in conjunction with the accumulator number defining the storage location in the accumulating one of the bridge ICs 332 or 334. After an accumulation frame, the associated bridge IC is placed in the transmission mode and, upon transmission, the data stored in the associated conference RAM 344 or 346 is then subtracted from the accumulated data when information is transmitted to a particular one of the conferees. For example, if the conference with "A", "B" and "C" were accumulated, the data from all three conferees would be accumulated in a separate and dedicated accumulator location in the bridge IC. Upon transmission of the conference data to conferee "A", the PCM data for conferee "A" which was stored during the accumulation mode would then be subtracted. This would result in only the accumulated data for conferee "B" and conferee "C" being transmitted to conferee "A".

The conference RAMs 344 and 346 have the address input thereof interfaced with conference multiplexers 348 and 350, respectively, through buses 352 and 354, respectively. The address data is the outbound time slot number. The conference multiplexers 348 and 350 each have two inputs, one input of which is connected to the bus 294 and the other input of which is connected to a modulo 672 counter 356 through a bus 358. The counter 356 is operable in a transmit mode to sequentially output the contents of the conference RAMs 344 or 346 in a similar manner to the operation of the counter 290. The counter 356 is also input to a path I.D. generator 360 which has the output thereof connected to the control input of the bridge ICs 332 and 334. Additionally, the bus 294 is input to a control circuit 362 which receives the various control bits and the different control fields. This is interfaced on the output thereof with the bridge ICs 332 and 334. Additionally, the bus 322 carrying the PCM data selected from the RAM banks 266 and 268 is connected to the input of a parity detect circuit 364, a path I.D. capture circuit 366 and a threshold detect circuit 368. The parity detect circuit has the output thereof connected to the control circuit 362 and the threshold detect circuit has the output thereof connected to the control circuit 362 also. The control circuit 362 is operable to control various functions of the bridge ICs 332 and 334. Additionally, the control circuits are also connected to the conference RAMS 344 and 346 to control the operation thereof with respect to Read and Write functions.

In operation, one of the control RAMs 300 or 302 is configured to output data under the control of the modulo 2016 counter 290. As described above, this data includes the inbound addresses for input to the RAM banks 266 or 268 to operate the selected one of the RAM banks in the accumulation mode. The other of the RAM banks 266 or 268 is in a collection mode and has the address input thereof connected to the bus 288 to receive the output of the modulo 216 counter 290 to sequentially receive data from the associated one of the datain latches 272 or 278 for storage therein. The data output by the selected one of the control RAMS 300 or 302 has the accumulator number portion thereof latched into one of the latches 340 or 342 associated with the accumulated one of the bridge ICs 332 or 334. The various conferees in each conference are then accumulated in the internal storage of the accumulating one of the bridge ICs 332 and 334 during the accumulating frame. In the next frame, the RAM banks 266 and 268 are alternated such that the data collected in the previous frame is now output for accumulation in the other of the bridge ICs 332 and 334. The one of the bridge ICs 332 and 334 that accumulated data in the previous frame is now controlled to output the conference to a predetermined one of the outbound time slots. At the same time, the conference RAM 344 or 346 associated with the transmitting one of the bridge ICs 332 and 334 is also controlled to output the subtraction data which is subtracted from the output conference. This provides the Echo Cancelling feature. The bridge ICs 332 and 334 are both connected to the input of a latch/converter circuit 370 through a bus 369 which performs the opposite conversion of the latch/converter circuits 324 and 326. This is then output to the bus 138 of FIG. 5.

A squelch function is provided with the threshold detection circuit 368 by inhibiting storage of data from a conferee that has noise but no information. For example, if a conferee is not speaking in a conference, the power present in this conferee's signal will not exceed a certain level. If the power level exceeds a predetermined threshold, this particular conference leg is assumed to be carrying useful information and is not taken out until the power level goes back down. A delay is desired so that, for example, silence in between syllables is not taken out. The reason for squelching is to prevent the addition of large numbers of silent conferees with noise; the summed noise of all the conferees would otherwise approach the power level of an individual conferee and make participation in such a conference unpleasant. The threshold detect circuit 368 is input to a latch/increment circuit 372. The latch/increment circuit 372 has the input thereof connected through a bus 374 to a multiplexer circuit 376. The output of the latch/incrementer circuit 372 is connected through a bus 378 to the input of two statistic RAMs 380 and 382. The address inputs of RAMs 380 and 382 are connected to the modulo 2016 counter 290 on bus 288 with the address for the RAM 382 delayed one clock through a delay latch 384.

The squelching operation is accomplished by comparing a factory determined number of consecutive frames of PCM on bus data 322 with detect circuit 368, with the power content of the signal below the desired squelch level, and then disabling the ability of the bridge ICs 332 and 334 to add that leg to a conference during the collection frame. One frame later, the ability to subtract it away during the output frame is also disabled. The frame that the power content goes above the squelch level, the bridge ICs are re-enabled to add the leg back into the conference. In the next frame, the leg is re-enabled for subtraction during the output frame. Once the power content goes above the squelch level, another sequence of the preset number of frames below the squelch level are needed before squelching is re-enabled.

There are a number of squelch counters for the squelch operation, one for each leg that can be added to any conference in one frame. The particular invention which is encompassed by this patent has 2016 counters, since it can add up to 2016 legs to anywhere from 1 to 672 different conferences. Each counter occupies a unique location within the static RAM 380 or 382. Each static RAM 380 has its address inputs interfaced to ten upper bits of the modulo 2016 counter 290 such that each squelch counter for a leg is available for two clock periods. Whenever the modulo 2016 counter 290 counts to an even value, a new squelch counter is read out of RAM 380. The data outputs of RAM 380 are interfaced to one input of a multiplexer 376, which when the modulo 2016 counter 290 is even, selects the inputs interfaced to statistic RAM 380 to be presented on the outputs. The outputs of the multiplexer 376 are interfaced to an increment/latch circuit 372 and to the control circuit 362. The control circuit 362 analyzes the state of the inputs interfaced to multiplexer 376 and if the count is at a value of 255, it disables the ability of the bridge ICs 332 and 334 to add the leg to a conference, or to subtract it on the next frame. The control circuit 362 and the increment/latch circuit 372 are also interfaced to the output of the threshold detect circuit 368, so that when an incoming leg has a power content above the threshold level, the control circuit 362 re-enables addition of the leg into a conference and the increment/latch circuit 372 latches a factory determined count into the latch that has to be incremented up again to 255 before squelching can be re-enabled. In this embodiment of the digital bridge, a control signal from the control bus 294 is either:

(1) interfaced to the threshold detector 368 to indicate the leg is not to be squelched regardless of its power content, by having the threshold detect circuit 368 indicate to the control circuit 362 and the increment/latch circuit 372 that the leg is always above the squelch threshold, or (2) the control signal from the control bus 294 is interfaced to the control circuit 362 and to the increment/latch circuit 372, indicating that squelching is not to take place regardless of whether the threshold detect circuit 368 indicates the leg is above or below the squelch threshold.

The increment/latch circuit 372 increments the value of the inputs interfaced to the multiplexer 376 and then latches it. If the value is at 255, it does not increment, but provides for a holding function so that the count does not wrap back around from 255 to 0. The latching clock is the 16 MHz clock that also drives the modulo 2016 counter 290.

As the modulo 2016 counter 290 increments next, it goes to an odd value; thus the upper ten bits of its address do not change and the same counter location in static RAM 380 is still accessed. The data inputs of the statistic RAM 380 are interfaced to the outputs of the increment/latch circuit 372. With the modulo 2016 counter 290 at an odd value, the static RAM 380 is now placed in a single Write cycle and the new value of the squelch count, stored in the increment/latch circuit 372, is written back into the static RAM 380.

The latch delay circuit 384 delays the value of the modulo 2016 counter 290 by one clock cycle, so that the static RAM 382 is one clock delayed from static RAM 380. Thus, while static RAM 380 is being written to with the contents of the increment/latch circuit, static RAM 382, whose outputs are interfaced to the input of the multiplexer 376, which is selected for outputting when the modulo 2016 counter is odd, will be presented to the inputs of the increment/latch circuit 372 and control circuit 362 for the next leg. This enables the squelch circuit to have two clock cycles available for reading from and writing to each of the static RAMS 380 and 382, while providing continuous coverage of each leg.

Figure 9:
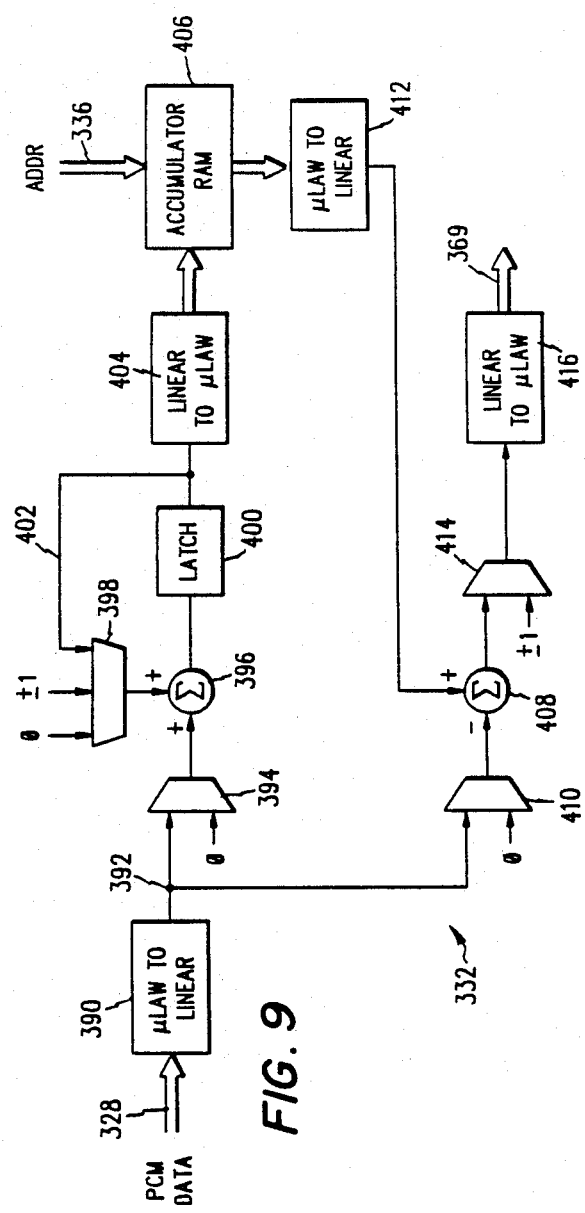
FIG. 9 illustrates a schematic block diagram of the bridge IC circuit.

Referring now to FIG. 9, there is illustrated a schematic diagram of the bridge ICs 332 and 334, wherein like numerals refer to like parts in the various FIGURES. For illustrative purposes, bridge IC 332 will be described. However, it should be understood that the bridge IC 334 is identical. The PCM data on the bus 328 is input to a $\mu$ law to linear converter 390, with the output thereof input to a node 392. Node 392 is input to one input of a multiplexer 394, the other input of which is connected to a "0" value. The output of the multiplexer 394 is input to a summation circuit 396 and the other input is connected to the output of a multiplexer 398. The summation circuit 396 has the output thereof connected to a latch 400 to allow the data summed by the summation circuit 396 to be latched. The output of the latch 400. The output of latch 400 is input back to one input of the multiplexer 398 on line 402. The multiplexer 398 has two other inputs, one input of which is connected to a "0" value and the other input which is connected to a value that alternates between a positive and a negative value of "1". The output of latch 400 is also connected to a linear to $\mu$ law converter 404 which converts the linear value to the $\mu$ law value, which value is input to the data input of an accumulator RAM 406. The accumulator RAM 406 provides the internal storage locations for storing accumulated data representing conferences in accordance with the address received on the address bus 336.

The circuit described up to the present point allows data to be input to the summation circuit 396, latched in the output data latch 400 and then fed back around to be summed with the next sequential value of the PCM data. As described in a prior example, if data from the three conferees, "A", "B", and "C" wee to be added, the data associated with conferee "A" would first be received and latched into latch 400 and input back into the second input of the summation circuit 396. On the next time slot, the data for conferee "B" would be presented to the input of the summation circuitry 396 and summed with the information for conferee "A", resulting in an accumulated value "A+B". On the next time slot, the data corresponding to conferee "C" will be summed with the accumulated value resulting in a new accumulated value "A+B+C". This value will then be stored in the accumulator RAM 406 in accordance with the accumulator address on bus 336. A new accumulator address would then be presented to the accumulator RAM 406, and then new data for a new conference input to the bridge IC 332. It should be understood that this all occurs in a single accumulation frame.

After data for the various conferences are stored in the accumulator RAM 406, the bridge IC 332 is placed in the transmission mode. In this mode, the modulo 672 counter 356 illustrated in FIG. 8 will then be connected to the address input of the conference RAM 344 which will then sequentially output both an accumulator address and subtraction data. As described above, the data was arranged in the conference RAM 344 in accordance with the outbound addresses which were generated by the control RAM 300 or 302 during the accumulation frame. In addition, the accumulator number or addresses are also stored in association with the data at each of the associated address locations in the conference RAM 344. During the transmission frame, each time that data is output in a particular time slot, it is possible to subtract the data of the conferee associated with that time slot.

The subtraction circuitry utilizes a subtraction circuit 408 which has a minus input connected to the output of a multiplexer 410. Multiplexer 410 has two inputs, one input of which is connected to the node 392 to receive the converted PCM data and the other input thereof which is connected to a "0" value. The positive input of the subtraction circuit 408 is connected to the output of a $\mu$ law to linear conversion circuit 412 which has the input thereof connected to the output of the accumulator RAM 406. The output of the subtraction circuit 408 is connected to one input of a multiplexer circuit 414, the output of which is connected to a linear to $\mu$ law conversion circuit 416. The output of the linear to $\mu$ law circuit 416 is connected to the bus 369. The multiplexer 414 also has a second input connected to an input that varies between the positive and negative value of "1".

In operation, the accumulator address output by the conference RAM 344 in the transmission mode accesses the accumulated data "A+B+C" for input to the positive input of the subtraction circuit 408. At the same time, the multiplexer 410 selects the node 392 and inputs the PCM data associated with either conferee "A", conferee "B", or conferee "C" to the negative input of the subtraction circuit 408 for subtraction of that data. This provides the Echo Cancelling feature of the bridge IC.

During organization of the data in the conference RAM and in the accumulator RAM, it is necessary to arrange the various fields in the control RAM such that they sequentially output the various inbound addresses, outbound addresses and the accumulator numbers or addresses. In addition, control information necessary to determine whether information is to be added, subtracted and also information as to which PCM data constitutes the first conferee in a conference is also output. Also, squelch information is contained in the various fields of the control RAM data.

For example, in the conference with conferees "A", "B", and "C", the information with respect to conferee "A" would be the first information output by the conference RAM. This would contain in the inbound field the address for RAM banks 266 and 268 associated with conferee A. This would allow the information associated with conferee A that was stored during a collection frame to be output during the accumulation frame. In addition, the accumulator number associated with the conference would be stored in the accumulator field, and the outbound time slot for conferee A would be stored in the outbound slot. There would also be a bit that would be set high to dictate that conferee A was the first leg of the conference. For subsequent conferees, this bit would be set low. This bit corresponds to the "0" value input into multiplexer 398, wherein multiplexer 398 would select the "0" value on the first leg such that a previous latched conferee from another conference would not be summed with the information from conferee "A".

When the information for conferee "A" is output from either RAM bank 266 or RAM bank 268 during the accumulation frame, it is accumulated and stored in the accumulator RAM 406 in accordance with the address in the accumulator number field. Additionally, this information is also stored in the conference RAM 344 in a location associated with the address in the outbound field. Thereafter, the PCM data associated with conferee "B" and "C" is then output, with the difference being that a different outbound address would be provided by the control RAMs 300 and 302.

With respect to the overall operation of the digital bridge, it can be seen that one advantage provided by the digital bridge circuit of the present invention is that access is provided to 8,064 separate PCM channels internal to the bridge card while allowing 672 of the channels to participate in a single conference or multiple conferences. This access to the 8,064 PCM channels is provided while only occupying 672 channels of the entire matrix.

In summary, there has been provided a time slot interchange system which utilizes a distributed storage system with storage of information at a plurality of nodes in the system. Each of the storage nodes receives and stores all of the data transmitted to the system during a collection frame. On a transmission frame, each node is provided access to all of the information in the system with no interference from the transmission requirements of other nodes. During a collection frame, information is simultaneously stored in each of the nodes by dedicated pathways from each of the stored nodes both to itself and each of the remaining nodes in the system. Therefore, the system is non-blocking and allows access to the information in accordance with a predetermined interconnection pattern stored at each of the nodes. The entire system is synchronized with an administrative subsystem. Conferencing is provided wherein one of the nodes is dedicated to a conference feature. The conference node has all the information in the system stored thereat. This information is accessible during an accumulation frame to accumulate information in a conference and then transmit this information during a transmission frame to predetermined ones of the other nodes.

Although the preferred embodiment has been described in detail, it should be understood that various changes, substitutions and alterations can be made therein without departing from the spirit and scope of the invention as defined by the appended claims.

What is claimed is:

1. A digital bridge circuit for enabling conference bridging of digital call signals between select ones of a plurality of ports in a switch matrix, comprising:
   call signal storage means for receiving and storing in a collection time frame from the switch matrix digital call signals received by all of the ports in the switch matrix;
   conference template storage means for storing a conference template defining a plurality of conferences and the ones of said digital call signals associated with conferees in each of said plurality of conferences;
   accumulating and summing means coupled to said call signal storage means and said conference template storage means, said accumulating and summing means operable to accumulate and sum the digital call signals associated with said conferees in each of said conferences during an accumulation time frame to provide a digital conference signal for each of said conferences, said accumulation time frame occurring after said collection time frame;
   conference storage means coupled to said accumulating and summing means for storing said digital conference signals; and
   transmitting means coupled to said accumulating and summing means for transmitting to the switch matrix for each of said conferees in each of said conference said associated stored digital conference signal for routing to said conferees by the switch matrix during a transmission frame, said transmission frame occurring after said accumulation frame.

2. The digital bridge circuit of claim 1 and further comprising subtraction means coupled to said accumulating and summing means for subtracting the digital call signal of a select one of said conferees from the one of said associated stored digital conference signals transmitted by said transmitting means to the switch matrix which is to be routed by the switch matrix to said select 3. The digital bridge circuit of claim 2 wherein said subtraction means comprises:
   subtraction storage means for storing said digital call signals associated with each of said conferees during said accumulation time frame;
   means for accessing the one of said stored digital call signals in said subtraction storage means that is associated with said select conferee during said transmission time frame when said transmitting means is transmitting to the switch matrix the one of said digital conference signals associated with said select conferee; and
   subtraction circuitry for subtracting said accessed one of said stored digital call signals from the accessed one of said digital conference signals during transmission thereof such that said associated conferee does not receive digital call signals originated by said associated conferee which was stored in said storage means.

4. The digital bridge circuit of claim 1 and further comprising means coupled to said conference template storage means for updating said conference template after each of said accumulation frames.

5. The digital bridge circuit of claim 4 wherein said conference template storage means comprises:

first and second memory means, each for storing said conference templates;

means for alternately activating said first and second memory means for outputting said conference template; and means for storing an updated conference template during said accumulation time frame in the other of said first and second memory means such that said updated conference template can be utilized on the next successive accumulation frame.

6. The digital bridge circuit of claim 1 and further comprising:

threshold detect means coupled to said call signal storage means for determining during said accumulation frame if said digital call signal has a value greater than a predetermined threshold; and inhibiting means coupled to said threshold detect means and said accumulating and summing means for inhibiting summation of said digital call signal having a value less than said predetermined threshold during summation by said means for accumulating and summing, said inhibiting means operating during said accumulation frame.

7. The digital bridge circuit of claim 1 wherein the switch matrix comprises a time slot interchange matrix for receiving digital call signals from the plurality of ports during said collection frame in predetermined time slots and transmitting the received digital call signals during said transmit time frame in predetermined transmit time slots wherein:

said transmit means transmits said digital conference signals in predetermined ones of the transmit time slots to predetermined ports in the switch matrix;

said conference template containing predetermined outbound time slot information associated with each conferee; and means coupled to said conference template storage means for accessing said conference templates during said transmit time frame to determine when to access from said means for accumulating and summing to determine which of said predetermined transmit time slots said digital conference signals are to be transmitted in.

8. A digital bridge circuit for enabling conference bridging of digital call signals between select ones of plurality of ports in a time slot interchange digital switch matrix wherein the digital call signals are collected from the ports in a collection frame during predetermined collection time slots, and wherein the collected digital call signals are transmitted to the ports of the switch matrix during predetermined transmit time slots, the digital bridge circuit comprising:

call storage means coupled to said ports for storing the received digital call signals of the switch matrix for all of the ports thereof during the collection time frame;

template storage means for storing a conference template containing information that defines a plurality of conferences each having at least two conferees therefor and defining an outbound time slot corresponding to tone of the transmit time slots associated with each of the conferees in their associated conferences;

access means coupled to said call storage means for accessing said stored digital call signals associated with said conferees that were defined in said conference template;

accumulation storage means coupled to said template storage means for storing digital conference signals for each of said conference;

summing means coupled to said access means for summing said accessed digital call signals for said conferees associated with each of said conferences to provide a digital conference signal for each of said conferences, said summing means coupled to said accumulation storage means for storing said digital conference signals in said accumulating storage means during an accumulation frame that occurs after said collection frame; and transmit means coupled to said accumulation storage means for accessing said stored digital conference signals for each of the conferees and transmitting said accessed digital conference signals for output to select ports in the switch matrix during said predetermined time slots associated with said conference template, said digital conference signal output to select ports in the switch matrix during a conference transmit time frame that corresponds to a collection time frame of the switch matrix such that said digital conference signal can be routed to the port associated with said conferees.

9. The digital bridge circuit of claim 8 and further comprising subtraction means coupled to said transmit means and said access means for subtracting said accessed digital call signal accessed by said access means and associated with the conferee to which said digital call signal is to be routed.

10. The digital bridge circuit of claim 8 and further comprising means coupled to said template storage means for updating said conference template during said conference without destroying said conference.

11. The digital bridge circuit of claim 8 wherein said call storage means comprises:

a memory bank having a plurality of storage locations arranged in a predetermined order;

read means operable in the collection mode for sequentially storing said digital call signals in accordance with the time at which they were received in accordance with the collection time slots; and write means coupled to said template storage means for randomly accessing said memory bank in accordance with said conference template wherein said conferences are arranged in a predetermined order with said conferees in each of said conferences also arranged in a predetermined order, said conferees in each of said conferences sequentially accessed from said memory during said accumulation frame.

12. The digital bridge circuit of claim 11 wherein said accumulation storage means comprises a memory having a plurality of storage locations for storing said digital conference signal for each of said conferences, and wherein said summing means comprises:

a summing circuit for sequentially summing each of said digital call signals accessed by said access means associated with each of said conferees in said conference; and write means for accessing one of said storage locations in said accumulation storage means as determined by said conference template for each of said conferences, each of said storage locations associated with one of said conferees.

13. The digital bridge circuit of claim 8 and further comprising threshold detect means coupled to said call storage means for detecting during said accumulation frame if said digital call signal has a value less than a predetermined threshold; and
    means coupled to said threshold detect means and said summing means for inhibiting summation by said summing means of the one of said access digital signals with the associated conferee when said digital call signal has a value less than a predetermined threshold.

14. A method for enabling conference bridging of digital call signals from a plurality of ports in a switch matrix, comprising:
    receiving and storing in a collection time frame call signals received by all of the ports in the switch matrix;
    storing a conference template defining a plurality of conferences and the ones of said digital call signals associated with conferees in each of said plurality of conferences;
    accumulating the digital call signals associated with said conferees in each of said conferences defined by said conference template during an accumulation time frame to provide a digital conference signal for each of said conferences, said accumulation time frame occurring after said collection time frame;
    storing said digital conference signals; and
    transmitting to the switch matrix for each of said conferees in each of said conferences said associated stored digital conference signal for routing to said conferees by the switch matrix during a transmission frame, said transmission frame occurring after said accumulation frame.

15. The method of claim 14 and further comprising subtracting the digital call signal of said conferee from the one of said associated stored digital conference signals transmitted by said transmitting means to the switch matrix which is to be routed by the switch matrix to said associated conferee.

16. The method of claim 15 wherein said subtracting step comprises:
    storing said digital call signal associated with each of said conferees during said accumulation time frame;
    accessing the one of said stored digital call signals that is associated with said select conferee during said transmission time frame during transmission to the switch matrix the one of said digital conference signals associated with said select conferee; and
    subtracting said accessed one of said stored digital call signals from the accessed one of said digital conference signals during transmission thereof such that said associated conferee does not receive digital call signals originated by said associated conferee which was stored.

17. The method of claim 14 and further updating said conference template after each of said accumulation frames.

18. The method of claim 17 wherein said updating step comprises:
    storing said conference templates in first and second locations;
    alternately activating either said first or second locations for outputting said conference template; and
    storing an updated conference template during said accumulation time frame in the other of said first and second locations such that said updated conference template can be utilized on the next successive accumulation frame.

19. The method of claim 14 and further comprising:
    determining during said accumulation frame if said digital call signal has a value greater than a predetermined threshold; and
    inhibiting accumulation of said digital call signal having a value less than said predetermined threshold during summation, said inhibiting occurring during said accumulation frame.

20. The method of claim 14 and further comprising:
    receiving digital call signals from the plurality of ports during said collection frame in predetermined time slots and transmitting the received digital call signals during said transmit time frame in predetermined transmit time slots wherein:
    said digital conference signals are transmitted in predetermined ones of the transmit time slots to predetermined ports in the switch matrix;
    said conference template contains predetermined outbound time slot information associated with each conferee; and
    said method further comprising the step of accessing said conference templates during said transmit time frame to determine when to accumulate and sum to determine which of said predetermined transmit time slots said digital conference signals are to be transmitted in.

21. A method for enabling conference bridging of digital call signals between select ones of a plurality of ports in a time slot interchanged digital switch matrix wherein the digital call signals are collected from the ports in a collection time frame during predetermined collection time slots, and the collected digital call signals are transmitted to the ports of the switch matrix during predetermined transmit time slots, the method comprising:
    storing the received digital call signals of the switch matrix for all of the ports thereof during the collection time frame;
    storing a conference template containing information that defines a plurality of conferences each having at least two conferences therefor and defining an outbound time slot corresponding to one of the transmit time slots associated with each of the conferees in their associated conferences;
    during an accumulation time frame following said collection time frame, accessing from said call storage means said stored digital call signals associated with said conferees that were defined in said conference template;
    during said accumulation time frame, summing said accessed digital call signals for said conferees associated with each of said conferences to provide a digital conference signal for each of said conferences;
    during said accumulation time frame, storing said digital conference signals; and
    accessing said stored digital conference signals for each of the conferees and transmitting said accessed digital conference signals for output to select ports in the switch matrix during said predetermined time slots associated with the associated one of said conferees in accordance with said conference template, said digital conference signal output to select ports in the switch matrix during a conference transmit time frame that corresponds to a collection time frame of the switch matrix such that said digital conference signal can be routed to the port associated with said conferees.

22. The method of claim 21 and further comprising subtracting said access digital call signal and associated with the conferee to which said digital call signal is to be routed.

23. The method of claim 21 and further comprising updating said conference template during said conference without destroying said conference.

24. The method of claim 21 wherein said call storing step comprises:
providing a plurality of storage locations arranged in a predetermined order;
sequentially storing said digital call signals in accordance with the time at which they were received in accordance with the collection time slots; and
randomly accessing said storage locations in accordance with said conference template wherein said conferences are arranged in a predetermined order with said conferees in each of said conferences also arranged in a predetermined order, said conferees in each of said conferences sequentially accessed from said storage locations during said accumulation frame.

25. The method of claim 24 and further comprising:
providing a plurality of storage locations for storing said digital conference signal for each of said conferences;
sequentially summing each of said digital call signals accessed and associated with each of said conferees in said conference;
accessing one of said storage locations as determined by said conference template for each of said conferences, each of said storage locations associated with one of said conferees.

26. The method of claim 21 and further comprising detecting during said accumulation frame whether said digital call signal has a value less than a predetermined threshold; and
inhibiting summation of the one of said accessed digital signals with the associated conferee when said digital call signal has a value less than a predetermined threshold.

* * * * *